(12) United States Patent
Fukuoka et al.

(10) Patent No.: US 7,664,321 B2
(45) Date of Patent: Feb. 16, 2010

(54) IMAGE PROCESSING METHOD, SYSTEM, PROGRAM, PROGRAM STORAGE MEDIUM AND INFORMATION PROCESSING APPARATUS

(75) Inventors: Shigeo Fukuoka, Tokyo (JP); Hiroshi Tanioka, Kanagawa-ken (JP); Akihiro Usami, Kanagawa-ken (JP); Ken-Ichi Ohta, Kanagawa-ken (JP); Kitahiro Kaneda, Kanagawa-ken (JP); Hirohiko Ito, Kanagawa-ken (JP); Shinichi Kato, Kanagawa-ken (JP); Tomohiro Akiba, Tokyo (JP); Tomotoshi Kanatsu, Tokyo (JP); Reiji Misawa, Tokyo (JP); Yoshihide Terao, Kanagawa-ken (JP); Mitsuru Uzawa, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 823 days.

(21) Appl. No.: 10/536,187

(22) PCT Filed: Jan. 27, 2004

(86) PCT No.: PCT/JP2004/000710
§ 371 (c)(1),
(2), (4) Date: May 24, 2005

(87) PCT Pub. No.: WO2004/068368
PCT Pub. Date: Aug. 12, 2004

(65) Prior Publication Data
US 2006/0045386 A1    Mar. 2, 2006

(30) Foreign Application Priority Data

| Jan. 31, 2003 | (JP) | ............................. | 2003-024965 |
| Feb. 13, 2003 | (JP) | ............................. | 2003-035112 |
| Dec. 12, 2003 | (JP) | ............................. | 2003-415485 |

(51) Int. Cl.
*G06K 9/00* (2006.01)
(52) U.S. Cl. .................................................. 382/181
(58) Field of Classification Search ........................ None
See application file for complete search history.

(56) References Cited

U.S. PATENT DOCUMENTS 4,748,678 A * 5/1988 Takeda et al. ................ 382/306
(Continued)

FOREIGN PATENT DOCUMENTS

EP            0 459 792         12/1991
(Continued)

OTHER PUBLICATIONS

Japanese Office Action dated Sep. 22, 2008 in corresponding Japanese Application No. 2003-415485.
(Continued)

*Primary Examiner*—Brian P Werner
*Assistant Examiner*—Elisa M Rice
(74) *Attorney, Agent, or Firm*—Fitzpatrick, Cella, Harper & Scinto

(57) ABSTRACT

This invention provides the following environment. That is, an original document file corresponding to a document to be copied is specified from image data of that document to be copied, and a print process is made based on the specified file so as to prevent deterioration of image quality. Also, when a document to be copied is not registered, a registration process is executed to suppress deterioration of image quality in an early stage. Furthermore, since the document is converted into vector data, re-use of such document is facilitated, and deterioration of image quality can be suppressed even when an image process such as enlargement or the like is made. To this end, when an original digital file cannot be specified, an apparatus of this embodiment executes a vectorization process (S54), converts the obtained vector data into a data format that can be re-used by an application (S55), and registers the converted file in a file server (S56). With this registration process, since the location of the file is settled, that location information is composited on an image to be scanned using an identifier such as a two-dimensional barcode or the like (S48), and the composite image can be printed (S49). Even when the printed document is scanned again, a registered digital file can be easily specified.

28 Claims, 33 Drawing Sheets

U.S. PATENT DOCUMENTS

| | | | |
|---|---|---|---|
| 5,486,686 A * | 1/1996 | Zdybel et al. | 235/375 |
| 5,754,308 A | 5/1998 | Lopresti et al. | 358/403 |
| 5,815,704 A | 9/1998 | Shimotsuji et al. | 395/615 |
| 6,163,623 A | 12/2000 | Ohta | 382/176 |
| 6,466,329 B1 | 10/2002 | Mukai | 358/1.15 |
| 2001/0014176 A1 | 8/2001 | Kamada et al. | 382/181 |
| 2006/0221357 A1 | 10/2006 | Uzawa | 358/1.1 |

FOREIGN PATENT DOCUMENTS

| | | |
|---|---|---|
| EP | 0 751 672 | 1/1997 |
| EP | 1 256 900 | 11/2002 |
| JP | 5-28258 | 2/1993 |
| JP | 5-159062 | 6/1993 |
| JP | 6-176142 | 6/1994 |
| JP | 7-121699 | 5/1995 |
| JP | 8-44827 | 2/1996 |
| JP | 8-147445 | 6/1996 |
| JP | 8-235341 | 9/1996 |
| JP | 9-037004 | 2/1997 |
| JP | 10-063820 | 3/1998 |
| JP | 10-285378 | 10/1998 |
| JP | 2000-306103 | 11/2000 |
| JP | 2001-76095 | 3/2001 |
| JP | 2001-350763 | 12/2001 |
| JP | 2001-358863 | 12/2001 |
| JP | 2002-298078 | 10/2002 |

OTHER PUBLICATIONS

Supplemental European Search Report dated Feb. 27, 2009 in corresponding European Application No. 04705520.7., pp. 1 to 7.

Pavlidis Theo: "A Vectorizer and Feature Extractor for Document Recognition.", Computer Vision, Graphics, and Image Processing, vol. 35, No. 1, Jul. 1985, pp. 111-127, XP007907277.

Doermann D S: "An Introduction to Vectorization and Segmentation", Graphics Recognition. Algorithms and Systems. Second International Workshop, GREC '97. Selected Papers Springer-Verlag Berlin, Germany, 1998, pp. 1-8, XP007907278.

Doermann D: "The Indexing and Retrieval of Document Images: A Survey", Computer Vision and Image Understanding, Academic Press, US, vol. 70, No. 3, Jun. 1, 1998, pp. 287-298, XP004448875.

* cited by examiner

FIG. 6

| POINTER | LAYOUT | CHARACTER CODE STRING |
|---------|--------|----------------------|
| x x x x x x | x x x x x x | x x x x x x |
| | | |
| | | |

FIG. 8

BLOCK INFORMATION

| | PROPERTY | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | ON |
| BLOCK 2 | 3 | X2 | Y2 | W2 | H2 | ON |
| BLOCK 3 | 2 | X3 | Y3 | W3 | H3 | OFF |
| BLOCK 4 | 1 | X4 | Y4 | W4 | H4 | ON |
| BLOCK 5 | 3 | X5 | Y5 | W5 | H5 | ON |
| BLOCK 6 | 5 | X6 | Y6 | W6 | H6 | OFF |

PROPERTY 1 : text  2 : picture  3 : table  4 : line  5 : photo

INPUT FILE INFORMATION

| TOTAL NUMBER OF BLOCKS | N ( =6 ) |
|---|---|

FIG. 31

| | UPPER LEFT x-COORDINATE OF CHARACTER | UPPER LEFT y-COORDINATE OF CHARACTER | WIDTH OF CHARACTER | COLOR OF CHARACTER | HEIGHT OF CHARACTER | CHARACTER NUMBER IN DICTIONARY |
|---|---|---|---|---|---|---|
| 0 | UPPER LEFT x-COORDINATE OF CHARACTER | UPPER LEFT y-COORDINATE OF CHARACTER | WIDTH OF CHARACTER | COLOR OF CHARACTER | HEIGHT OF CHARACTER | CHARACTER NUMBER IN DICTIONARY |
| 1 | UPPER LEFT x-COORDINATE OF CHARACTER | UPPER LEFT y-COORDINATE OF CHARACTER | WIDTH OF CHARACTER | COLOR OF CHARACTER | HEIGHT OF CHARACTER | CHARACTER NUMBER IN DICTIONARY |
| 2 | UPPER LEFT x-COORDINATE OF CHARACTER | UPPER LEFT y-COORDINATE OF CHARACTER | WIDTH OF CHARACTER | COLOR OF CHARACTER | HEIGHT OF CHARACTER | CHARACTER NUMBER IN DICTIONARY |
| | | | | | | |
| | UPPER LEFT x-COORDINATE OF CHARACTER | UPPER LEFT y-COORDINATE OF CHARACTER | WIDTH OF CHARACTER | COLOR OF CHARACTER | HEIGHT OF CHARACTER | CHARACTER NUMBER IN DICTIONARY |

FIG. 32

| | |
|---|---|
| 0 | INTERMEDIATE DATA ID | FEATURE DATA |
| 1 | INTERMEDIATE DATA ID | FEATURE DATA |
| 2 | INTERMEDIATE DATA ID | FEATURE DATA |
| Nv | INTERMEDIATE DATA ID | FEATURE DATA |
| N | INTERMEDIATE DATA ID | FEATURE DATA |

IMAGE PROCESSING METHOD, SYSTEM, PROGRAM, PROGRAM STORAGE MEDIUM AND INFORMATION PROCESSING APPARATUS

TECHNICAL FIELD

The present invention relates to a technique for reading and computerizing printed documents.

BACKGROUND ART

In recent years, amid calls for environmental issues, move to paperless offices has been promoted, and various techniques that handle digital documents have been proposed.

For example, as a method of converting a paper document into a digital document, for example, Japanese Patent Application Laid-Open No. 2001-358863 describes a technique for scanning a paper document by a scanner, converting the scanned data into a digital document format (e.g., JPEG or the like), and transmitting the converted data. However, since the above technique described in Japanese Patent Application Laid-Open No. 2001-358863 aims at converting an image scanned by a scanner into a digital document such as JPEG or the like, it does not take any account of a search process of saved files using printed documents. Therefore, print and scan processes must be repeated, and a converted digital document image gradually deteriorates.

On the other hand, Japanese Patent Application Laid-Open No. 8-147445 discloses a technique for dividing document data into regions for respective properties, and saving all regions as raw image data (or compressed image data). However, since respective regions are handled as images, a large file size is required, and an image deteriorates if an edit process such as enlargement or the like is made.

On the other hand, a technique for searching for digital information corresponding to a paper document has been proposed. For example, Japanese Patent Application Laid-Open No. 10-063820 discloses a technique for identifying corresponding digital information on the basis of a scanned input image, and further describes an information processing apparatus which extracts a difference between the input image and digital information, and composites the extracted difference to the identified digital information. On the other hand, Japanese Patent Application Laid-Open No. 10-285378 discloses the following technique. That is, in a digital multi-function peripheral (MFP) (comprising a copy function, scan function, print function, and the like), it is confirmed if a scanned image includes a graphic code indicating a page ID, and if the graphic code is found, a database is searched for the corresponding page ID. If the page ID is found in the database, the currently scanned image is discarded, print data associated with that page ID is read out, and a print image is generated by a print operation and is printed on a paper sheet. On the other hand, if no corresponding page ID is found in the database, the scanned image is directly copied onto a paper sheet in a copy mode, or a PDL command is appended to the scanned image to convert the scanned image into a PDL format, and the converted data is transmitted in a facsimile or filing mode.

However, since the technique in Japanese Patent Application Laid-Open No. 10-063820 extracts difference information by searching for an original digital document corresponding to the output paper document, information additionally written on the paper document can be held as difference image. However, since the difference information directly handles a scanned image, a large storage capacity is required. In addition, if no original digital document corresponding to the output paper document is found, the process ends. In the technique in Japanese Patent Application Laid-Open No. 10-285378, if no original digital document corresponding to a paper document is found, a PDL command is appended to a scanned image to convert that image into a PDL format. However, when the PDL command is merely appended to the scanned image to convert that image into the PDL format, a large file size is required, and such file may cram the database.

DISCLOSURE OF INVENTION

The present invention has been made in consideration of these problems, and has as its object to provide a technique which specifies an original document file corresponding to a document to be copied on the basis of image data of that document, prints a document on the basis of that file to prevent image quality deterioration, and executes a registration process of an unregistered document by executing a vectorization process so as to suppress image quality deterioration in an early stage.

In order to achieve the above object, for example, an image processing system according to the present invention comprises the following arrangement. That is, an image processing system comprises:

search means for searching for original digital data stored in storage means on the basis of an input document image;

vectorization means for, when original digital data cannot be specified as a search result of the search means, executing a vectorization process for the input document image; and storage control means for storing vector data of the document image converted by the vectorization means in the storage means.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

FIG. 6 shows the data structure to be stored in a database in the embodiment of the present invention;

FIG. 8 shows the contents of data generated by block segmentation;

FIG. 31 shows the structure of a dictionary prepared upon executing the vectorization process of a text region; and FIG. 32 shows the structure of intermediate data upon executing the vectorization process of a text region.

BEST MODE FOR CARRYING OUT THE INVENTION

Preferred embodiments of the present invention will now be described in detail in accordance with the accompanying drawings.

<System Overview>

Figure 1:
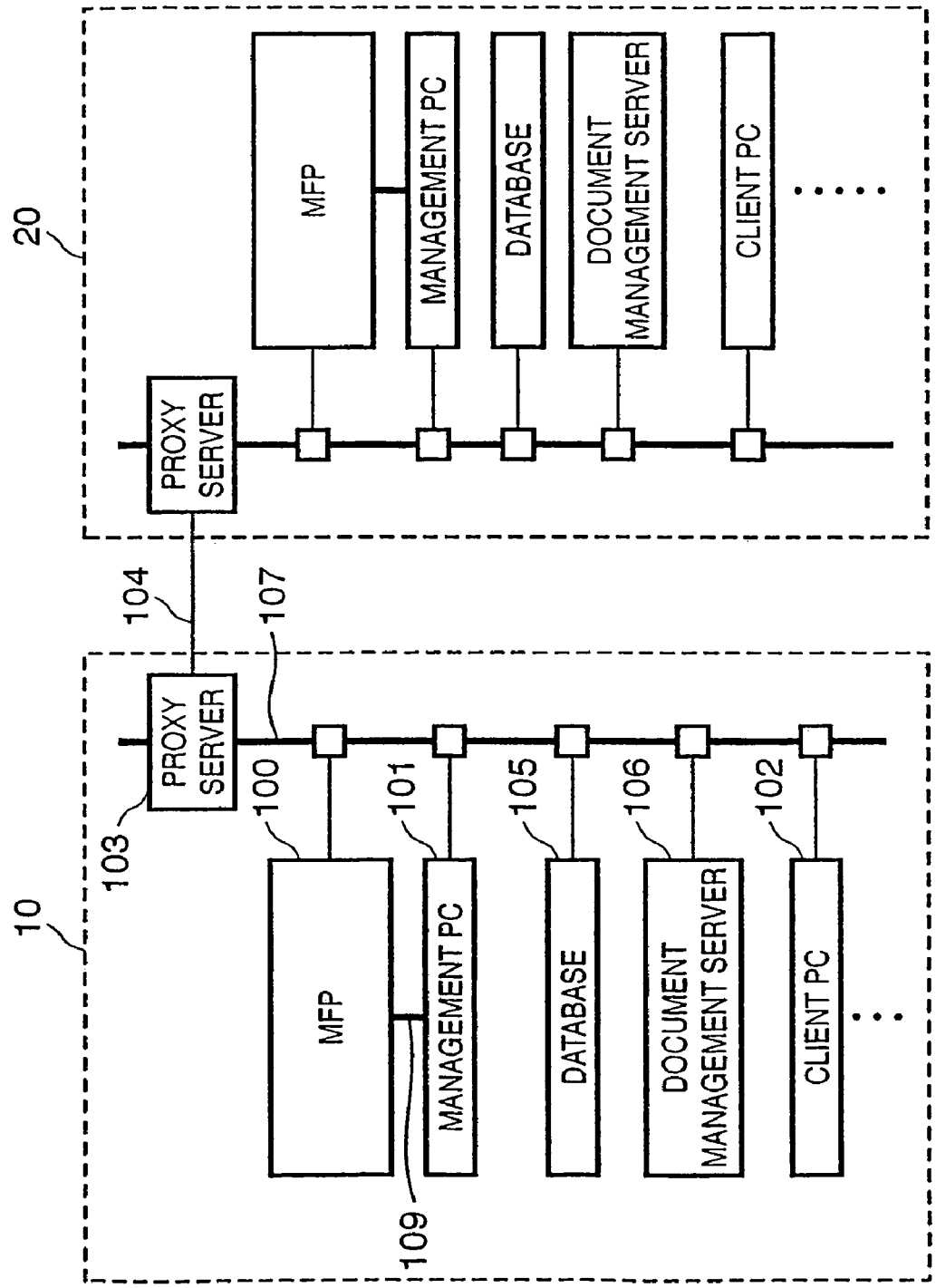
FIG. 1 is a network system diagram in an embodiment of the present invention.

FIG. 1 is a block diagram showing an example of the arrangement of an image processing system according to the present invention.

This image processing system will exemplify an environment in which offices 10 and 20 are connected via an Internet 104. Since the arrangement in the office 20 is substantially the same as that in the office 10, the office 10 will be explained below.

To a LAN 107 formed in the office 10, an MFP (Multi-Function Peripheral: a copying machine serving as a network scanner and network printer) 100, a management PC 101 for controlling the MFP 100, a client PC 102, a document management server (file server) 106 that manages document files, a database 105 which can undergo a search process using the format of document data or the like, and a proxy server 103 are connected. FIG. 1 illustrates only one client PC, but a plurality of client PCs can be connected.

The network 107 in the office 10 is connected to the Internet via the proxy server 103. The same applies to the office 20. Hence, the networks of the offices 10 and 20 can communicate information with each other via the Internet. Note that it is desired to avoid a third party from breaking into the networks in the offices 10 and 20 by a known technique such as VPN or the like, but since such technique itself is not directly related to the present invention, a description thereof will be omitted.

The MFP 100 in this embodiment has charge of an image scanning unit (scanner) of paper documents and some (pre-processes and the like) of image processes for a scanned image signal, and supplies image data to the management PC 101 via a LAN 109. The management PC 101 comprises a general personal computer, which has image storage means (a hard disk), image processing means (an image processing circuit or program), display means, and input means (a keyboard and a pointing device such as a mouse® or the like).

Figure 2:
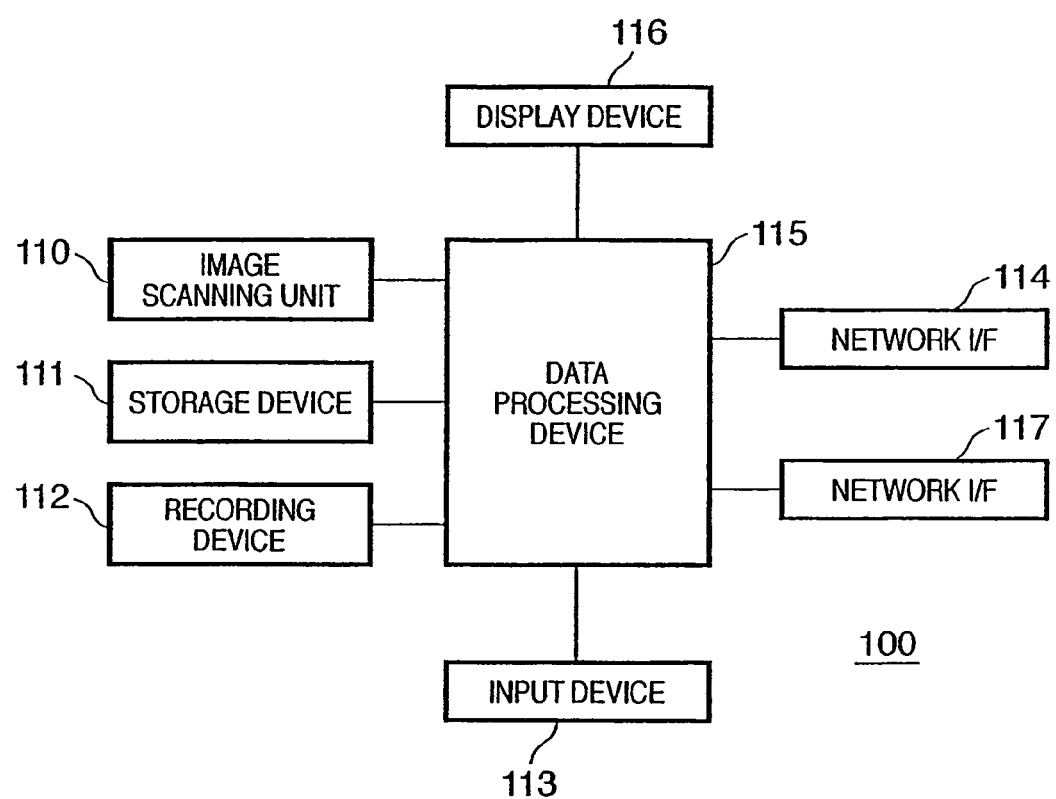
FIG. 2 is a block diagram of a multi function peripheral (MFP) in the embodiment of the present invention.

FIG. 2 is a block diagram showing the arrangement of the MFP 100. Referring to FIG. 2, an image scanning unit 110 including an auto document feeder (ADF) irradiates an image on each of one or a plurality of stacked documents with light coming from a light source, forms an image of light reflected by the document on a solid-state image sensing element via a lens, and obtains a scanned image signal in the raster order as image data at a resolution of, e.g., 600 dpi, from the solid-state image sensing element. In a normal copy process, the scanned image signal undergoes various correction processes and the like in a data processing device 115 to be converted into a recording signal, which is temporarily stored (saved) in a storage device 111 such as a hard disk or the like. The MFP 100 informs the management PC 101 that the recording signal is stored, and sequentially outputs the recording signal to a recording device (also serving as a printer engine) 112 under the control of the management PC 101, thus forming an image on a paper sheet.

Note that the MFP of this embodiment has a function of generating print image data in accordance with a page description language since it also serves as a network printer. When the MFP serves as a network printer, the data processing device 115 converts print data, which is output from the client PC 102 and is received from the LAN 107 via a network I/F 114 into recordable raster data, and temporarily stores the raster data in the storage device 111. Then, the MFP informs the management PC 101 of storage of that raster data, and sequentially outputs the raster data to the recording device 112 under the control of the management PC 101, thus forming an image on a paper sheet. At this time, information indicating whether the generated image data is obtained by scanning or is generated as a result of the network printer function is also sent to the management PC.

Reference numeral 113 denotes an input device which comprises various keys and switches, and a touch panel formed on a liquid crystal display screen; and 116, a liquid crystal display.

In the above arrangement, as will be apparent from a description to be given later, the reason why the management PC 101 is connected to the MFP 100 via the network 109 is to assure a high access speed of the storage device 111 and to prevent the influences on traffic of the network 107, since the storage device 111 in the MFP 100 is directly accessed by the management PC 101.

Figure 3:
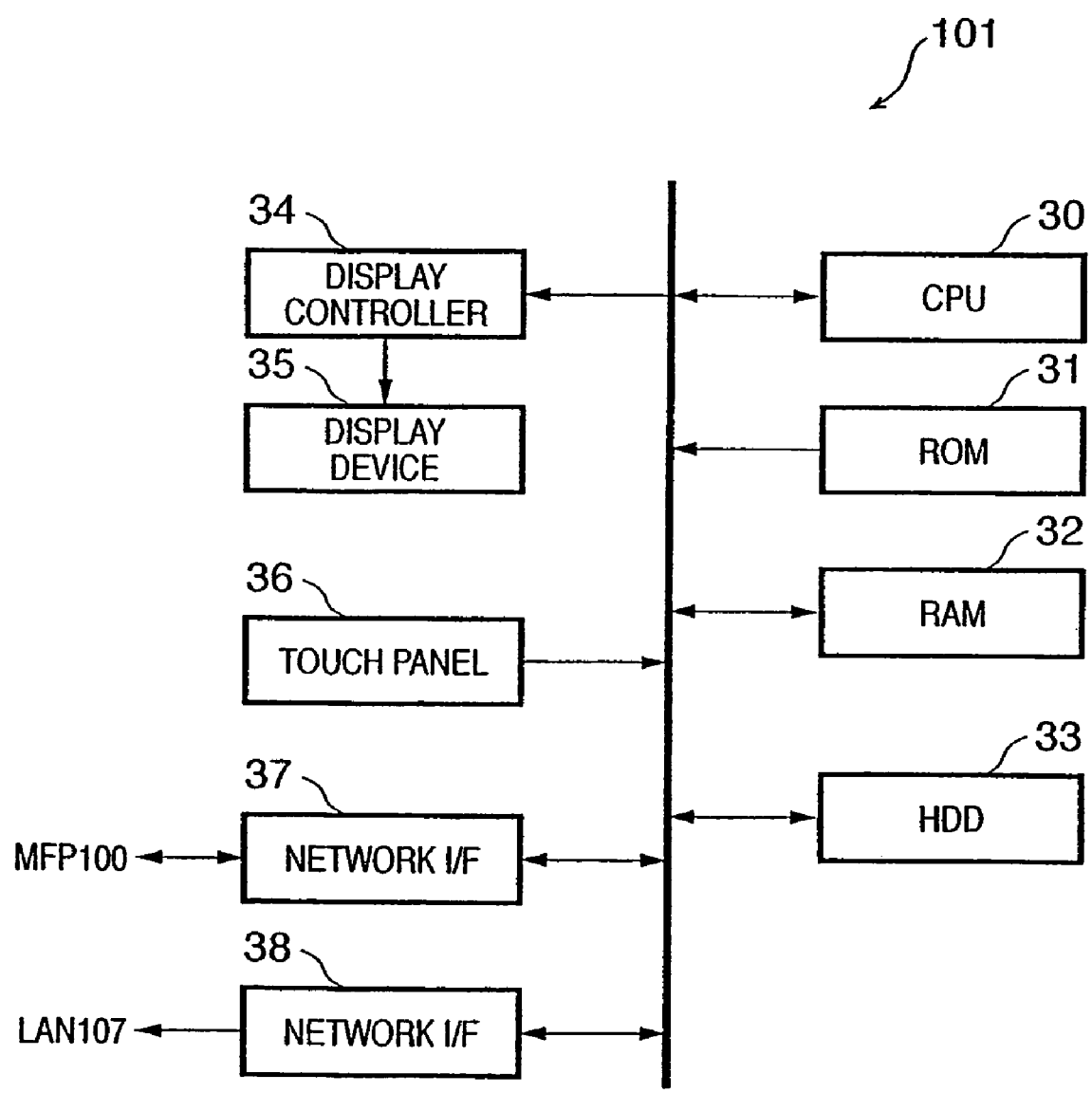
FIG. 3 is a block diagram of a management PC in the embodiment of the present invention.

FIG. 3 is a block diagram of the management PC 101 in this embodiment. The management PC 101 in this embodiment is implemented by a general personal computer. Referring to FIG. 3, reference numeral 30 denotes a CPU for controlling the overall apparatus; 31, a ROM that stores a boot program, BIOS, and the like; and 32, a RAM which is used as a work area of the CPU 30. On the RAM 32, an OS and program used to manage the MFP 100 in this embodiment are loaded and executed. Reference numeral 34 denotes a display controller which incorporates a video RAM. Reference numeral 35 denotes a display device. In this embodiment, a liquid crystal display device is adopted as the display device 35, but other display devices such as a CRT and the like may be used. Reference numeral 36 denotes a touch panel provided to the front surface of the screen of the display device 35. Reference numeral 37 denotes a network I/F used to communicate with the MFP 100; and 38, an I/F used to connect the network 107.

Normally, the personal computer comprises an input device such as a keyboard, a pointing device (mouse® or the like), and the like. In this embodiment, however, the touch panel serves as the input device in place of these devices. The personal computer may comprise a keyboard and mouse, or both the keyboard and mouse, and the touch panel may be used together.

Figure 4:
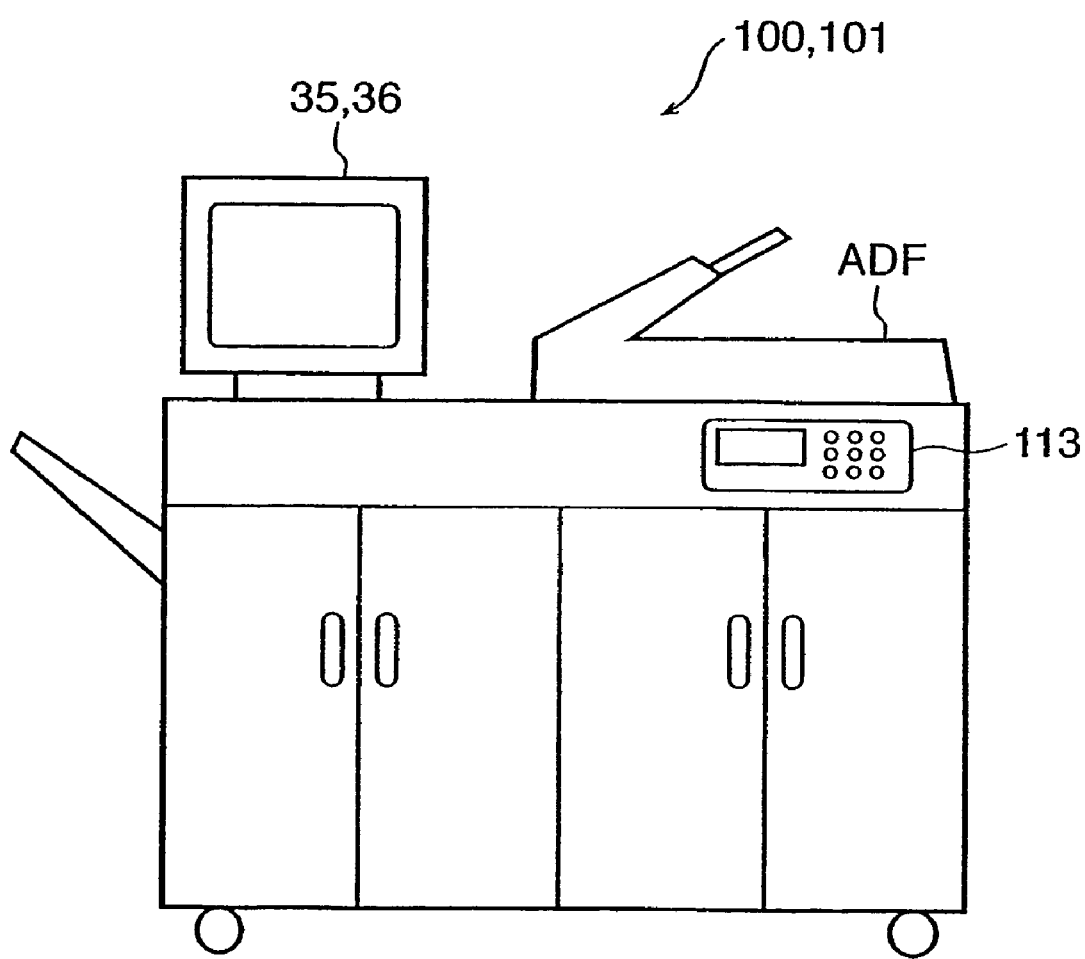
FIG. 4 is a view showing the outer appearance of the MFP in the embodiment of the present invention.

FIG. 4 shows an outer appearance of the MFP 100 that accommodates the management PC 101. As shown in FIG. 4, the display device 35 and touch panel 36 of the management PC 101 are arranged as if they appeared as a part of the MFP 100. Note that the keyboard and pointing device (mouse or the like) of a normal PC may be housed in a housing of the MFP so as to allow easy maintenance of the management PC 101.

As will be apparent from the following description, the display device 35 and touch panel 36 of the management PC 101 substantially serve as a user interface of the MFP 100. If such arrangement is adopted, a function that implements the process of the management PC 101 may be added to the MFP 100. However, since the management PC 101 covers various processes, a versatile personal computer, which is independent from the MFP as a multi function peripheral, is interposed in this embodiment in terms of easy development, management, and version-up of programs which implement these processes.

<Description of Processing Overview>

The processing contents of the system in this embodiment will be described below.

In the MFP 100, a document set on the ADF is scanned as image data having a resolution of 600 dpi by the image scanning unit 110. The scanned image data is stored as image data for one page in the storage device 111 in the MFP 100 via pre-processes (various correction processes). The management PC 101 monitors via the network 109 whether or not new image data is stored in the storage device 111 in the MFP 100. Alternatively, the management PC may receive a message via the network 109 when the MFP 100 stores a document image in the storage device 111.

In either case, when the management PC 101 determines that image data is stored in the storage device 111 in the MFP 100, it executes the following processes.

The scanned image data is segmented into regions by image region separation (block segmentation process). It is then checked if pointer information indicating the location of an original file is included. For example, a two-dimensional barcode is scanned under the assumption that the two-dimensional barcode is formed at a pre-set region position. If the two-dimensional barcode can be recognized and decoded, since that information includes location information (file name with server name+path) of the original file corresponding to the scanned document, the location information is displayed on the display device 35 of the management PC 101. For example, a message:

"stored as "xxxxx" in "shared folder xxx" in file server (document management server) "xxxxx" " is displayed.

Note that the two-dimensional barcode is used as pointer information, but other methods may be used. For example, a character string object that indicates a URL may be described, and may undergo character recognition to obtain pointer information. Also, pointer information may be included in an image using a method of embedding information by minutely changing the spacings between neighboring characters, a method of embedding information as a digital watermark in a halftone image, or the like.

When the user scans a document using the MFP 100 for the purpose of copying, the management PC 101 acquires an original file from the designated document management server, generates image data based on that original file, and composites a two-dimensional barcode image including the location information of the original file at a predetermined position of the generated image data. The management PC 101 stores the composite image data in the storage device 111 in the MFP 100. At this time, the management PC 101 erases image data which was scanned previously and stored in the storage device 111, or overwrites the image data generated based on the original file on the scanned image data. Then, the management PC 101 outputs a print process instruction command to the MFP 100 to control it to execute a print process.

Whether a document is scanned for the purpose of copying or of confirming the location of an original file is determined by sending, from the MFP 100 to the management PC 101, information indicating whether the user has instructed a key used to confirm the location of the original file or a copy key provided on a control panel of the MFP. Also, even when a document is scanned for the purpose of confirming the location, after the aforementioned message is displayed on the display device 35, a button for selecting whether or not a print instruction is issued is displayed on the touch panel 36, and a print process is executed upon detection of touch on that button.

Also, the MFP 100 can be used for the purpose of editing in addition to copying. For example, when a document is scanned by the MFP 100, its original file is chased up and information indicating its location is displayed. Hence, the user can edit that original file again using his or her own client PC via the network.

When a document is copied, image data is generated and printed based on an original corresponding to the document. Hence, even when a document to be scanned is slightly contaminated, a high-quality image can always be copied.

On the other hand, a document to be scanned by the MFP 100 may have no pointer information (two-dimensional barcode or the like). That is, the management PC 101 determines that image data stored in the storage device 111 in the MFP 100 has no barcode. In such case, already registered original files are searched for files approximate to the scanned document image data, thumbnail images are generated based on original data as candidates found by a search, and the thumbnail images and information indicating their locations are displayed as a list on the display device 35 of the management PC 101. Then, the user selects one file using the touch panel 36, thus printing an image based on the corresponding original file. If the user knows the location of that original file, he or she may explicitly designate its location and file.

If no candidate corresponding to the document image is found, it is determined that the scanned document is not registered, a message that advises accordingly is displayed on the display device 35, and a button used to instruct whether to register or not is displayed, thereby making the user confirm registration.

When the user inputs a registration instruction (by touching a "register" button), the scanned document data is converted into a predetermined data format, and is registered as a new file in the document management server 106 present on the identical network. Since the location of that file is determined upon registration, the location information is composited as a two-dimensional barcode upon printing.

Even when an original file is found, if that original file is a so-called image file such as JPEG, TIFF, or the like, the user can select whether or not that file is to be re-registered after vectorization.

When the MFP serves as a network printer, the aforementioned message is sent to the client PC as a source of print data, and is displayed on the screen of the client PC.

Therefore, when a new document is created and printed by an application which runs on the client PC, since that print data has no two-dimensional barcode, a window used to select a corresponding file is displayed, as described above. If the new document is not registered in the database of the document management server, that user instructs to save the document file created by himself or herself in the document management server.

<Details of Processing Contents>

The overview in this embodiment has been explained. Details of the processing sequence (mainly that of the management PC 101) will be described below with reference to the flow chart of FIG. 5. A case will be mainly explained below wherein a paper document is scanned by the MFP 100. The process executed when the MFP 100 serves as a network printer can be apparent from the above and following descriptions.

The image scanning unit 110 (including the ADF) of the MFP 100 is enabled to scan a document for one page in a raster order, and obtains an image signal of 600 dpi (8 bits per pixel). The image signal undergoes pre-processes (conversion processes and the like such as correction processes and the like) by the data processing device 115, and is saved as image data for one page in the storage device 111.

Figure 5:
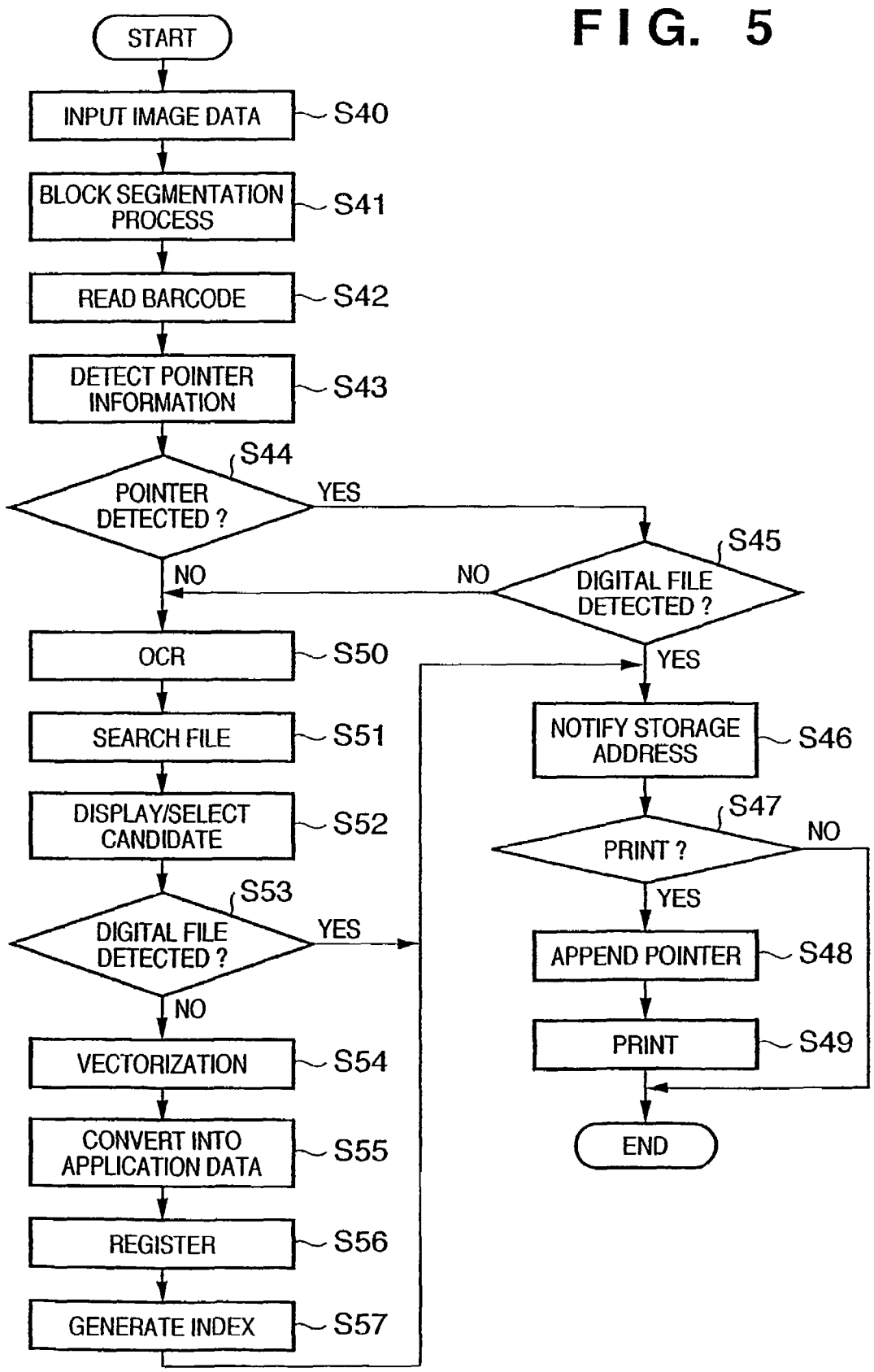
FIG. 5 is a flow chart showing the processing sequence of the management PC in the embodiment of the present invention.

The flow chart in FIG. 5 is the processing sequence of the CPU 30 executed upon reception of a storage completion message from the MFP 100 when image data for one page is stored in the storage device 111 of the MFP 100 or upon detection of storage of image data for one page in the storage device 111 of the MFP 100.

In step S40, image data stored in the storage device 111 is loaded onto the RAM 32 via the LAN 109. In step S41, a text/line image region and a halftone image part undergo region separation for respective rectangular blocks. A text part is separated into rectangular blocks combined as clusters for respective paragraphs, and a line image part is separated into tables and graphics formed of lines, and these tables and graphics are then segmented. On the other hand, a halftone image part is segmented into independent objects for respective blocks such as a halftone image part, background part, and the like.

When the flow advances to step S42, pointer information (two-dimensional barcode or the like) recorded in a document image as additional information is detected, and the barcode is decoded. Then, pointer information in the storage device that stores an original digital file is detected from the information decoded in step S42 (step S43).

In the description of this embodiment, the pointer information is expressed by a two-dimensional barcode. However, the present invention is not limited to the two-dimensional barcode, and a URL indicating the location of an original file may be described at a predetermined position in a document image. In some cases, pointer information which is imperceptible to a person may be embedded by a technique so-called digital watermarking. Of course, any of these methods may be used. In this connection, as a method of embedding information as a digital watermark, a method of embedding information by adjusting the spacings between neighboring characters, a method of embedding information by changing pixel values in a halftone image, and the like may be used.

It is checked in step S44 if pointer information is detected. If it is determined that pointer information is detected, the flow advances to step S45 to check if a file is stored in the document management server (that in either the office 10 or 20) designated by that pointer information. If the presence of the file can be confirmed, the flow advances to step S46 to display that storage address on the display device 35, and also display a print instruction button and non-print instruction button. Note that an edit button, transfer button, and the like may be displayed in place of the non-print instruction button.

If it is determined in step S47 that the non-print instruction button is touched, this process ends (if the edit button, transfer button, and the like are displayed in place of the non-print instruction button, an edit process, transfer process, or the like is executed). If it is determined in step S47 that the print instruction button is touched, the flow advances to step S48 to load an original file designated by the pointer information, to generate print image data based on that original file, and to generate and composite a two-dimensional barcode image including the pointer information at a predetermined position of the generated image data. The composite print image data is stored in the storage device 111 in the MFP 100 via the LAN 109. At this time, the image data which is obtained by scanning the document and is already stored in the storage device 111 is deleted. After that, the flow advances to step S49 to issue a print instruction to the data processing device 115 of the MFP 100. In response to this instruction, the data processing device 115 in the MFP 100 converts the print image data into data for respective recording color components (in case of a color printer), and controls the recording device 112 to print an image.

On the other hand, if no pointer information is detected in step S44 (including a case wherein no two-dimensional barcode is detected) or if pointer information can be detected but no corresponding original file is found in step S45, the flow advances to step S50, and characters in blocks which are determined as text regions in the above block segmentation process undergo a recognition process (OCR process). In step S51, words are extracted from the OCR result to make a full-text search or a so-called layout search is made on the basis of the layout of respective objects and the properties of the objects. This search is conducted for the database 105.

The contents of the database managed by the database 105 have a structure shown in, e.g., FIG. 6. As shown in FIG. 6, one record is made up of a pointer field indicating the location of a file, a layout field which includes the positions, number, and properties (information indicating a text, line image, or halftone region) of segment blocks which form one page, and character code information included in the text region.

The search process in step S51 is conducted by passing, to the database 105, information of the positions and properties of segment blocks for one scanned page, and a plurality of words obtained by the OCR process.

If this search request process is executed, and similar candidate files are found, since the search result (including pointer information and layout information) is sent from the database 105, thumbnail images of respective candidates are generated in accordance with the layout information of the candidates, and are displayed as a list on the display device 35, thus prompting the user to select one of the candidates (step S52). Since each thumbnail image has a small size, the thumbnail image is generated by displaying characters using "•" and the like, and pasting appropriate graphic and image data as graphic and image parts. Alternatively, the thumbnail image may be generated by reducing an original file. The user visually compares the rough layout of the document scanned by himself or herself, and the layouts of candidates displayed on the display screen, and selects a desired one of thumbnail images by touching it.

As described above, if candidates are retrieved in step S51 and one of these candidates is selected in step S52, the flow advances to step S53 to search for a corresponding original file using pointer information corresponding to the selected thumbnail image. If the selected original file is a non-vectorized image file such as JPEG, TIFF, BMP, or the like, a query about whether or not that image file is to be registered after vectorization is issued. If the user inputs a registration instruction, the following steps S54 to S57 are executed. On the other hand, if the original file corresponding to the selected thumbnail is a vectorized file, the flow advances to step S46 without any query about vectorization, and the processes in step S47 and subsequent steps are executed.

If no file similar to the document image is found as a result of a search in step S51, a message indicating that no similar image is found is sent in step S52, and it is determined in step S53 that no original digital file is found. The flow then advances to step S54.

If it is determined in step S45 that an original file is found, and if that original file is a non-vectorized image file such as JPEG, TIFF, or the like, a query about whether or not that file is to be registered after vectorization is issued as in step S53. Upon reception of a registration instruction, the processes in steps S54 to S57 may be executed.

If no original file is found, or if it is determined that the original file is found but is a non-vectorized image file such as JPEG, BMP, or the like, and an instruction for converting that image file into vector codes and registering the converted file is received, the flow advances to step S54 to execute a vectorization process (to be described later) for respective segment blocks in accordance with the contents which are set in advance.

For example, as for a segment block which is determined as a text region, outlines of character images are identified to extract outline vectors along the outlines of the character images, thus vectorizing the text region. In this case, the OCR process results are held as character codes corresponding to vector data of respective characters.

In place of the aforementioned process for extracting outline vectors on the basis of the outlines of character images, since character codes are already obtained as the OCR processing results, a character size, style, and font required to faithfully reproduce a document image are identified, and the character codes of the OCR results may be vectorized using outline data prepared for each character type (font type, style).

Alternatively, the process may be automatically switched in correspondence with the OCR precision (for example, the recognition ratio or the similarity of the OCR result can be used as an index of the OCR precision): if the OCR precision is high, "a vectorization process based on the OCR results and outline data for respective character types" may be executed; if the OCR precision is low or no corresponding font is available, "a vectorization process that extracts outline vectors based on the outlines of character images" may be executed.

If outline data for respective character types are installed in the MFP or client PC, text data with a format of a corresponding segment may be generated by identifying the character code of the OCR result and its character size, style, and font, and may be used as vectorized data.

Assume that one of these vectorization sequences to be used is set in advance.

A segment block, which is determined as a graphic region, undergoes a vectorization process by extracting outline vectors of a line image.

As for a segment block which is determined as a halftone region (a natural image region such as a photo), a compression technique such as JPEG or the like is used.

These processing contents for respective blocks are processed in accordance with process setups corresponding to respective properties. These vectorization processes are done for respective blocks, and layout information of respective blocks is saved.

After the vectorization process, the flow advances to step S55 to combine the respective blocks into one file on the basis of the layout information, and to convert that file into an application data file that can be edited by an application. Details of generation of an application data file will be described later. For example, image data and vector data are embedded in a document, and the embedded document is saved in an rtf (Rich Text Format) format. By loading the saved rtf file by an application that can handle such rtf files, not only text data but also graphic and image data can be restored to an editable state. Note that the application data file to be converted is not limited to the rtf format that can embed objects, but may be converted to other file formats such as an SVG (Scalable Vector Graphics) format and the like.

The flow advances to step S56 to register the file in the local document management server 106 to which the management PC 101 is connected. Also, the positions, number, and properties (text, graphic, or halftone image type) of respective segment blocks obtained by the block segmentation process, character codes obtained by the OCR process, and pointer information upon storing the file in the document management server 106 are registered together in the database 105.

After that, index information (including the pointer information) to be stored as a two-dimensional barcode is generated in step S57, and the flow then advances to step S46.

When the flow advances to step S46, the location of the file upon registration is notified. If a print instruction is issued in step S47, a two-dimensional barcode is generated based on the generated index information, and is composited to image data read out from the storage device 111 of the MFP 100 (step S48), thus issuing a print instruction.

In the above description, a document is set on the MFP 100 and is scanned. As described above, the MFP 100 of this embodiment also serves as a network printer. Therefore, the same process is done when print data of a document image is received from the client PC 102. That is, when the MFP receives print data from the client PC, it also temporarily stores a document image for one page in the storage device 111. In this case, however, the location message of the original file is sent from the management PC 101 to the client PC via the network 107.

The contents of the respective processes will be described in detail hereinafter.

[Block Segmentation Process]

Figure 7:
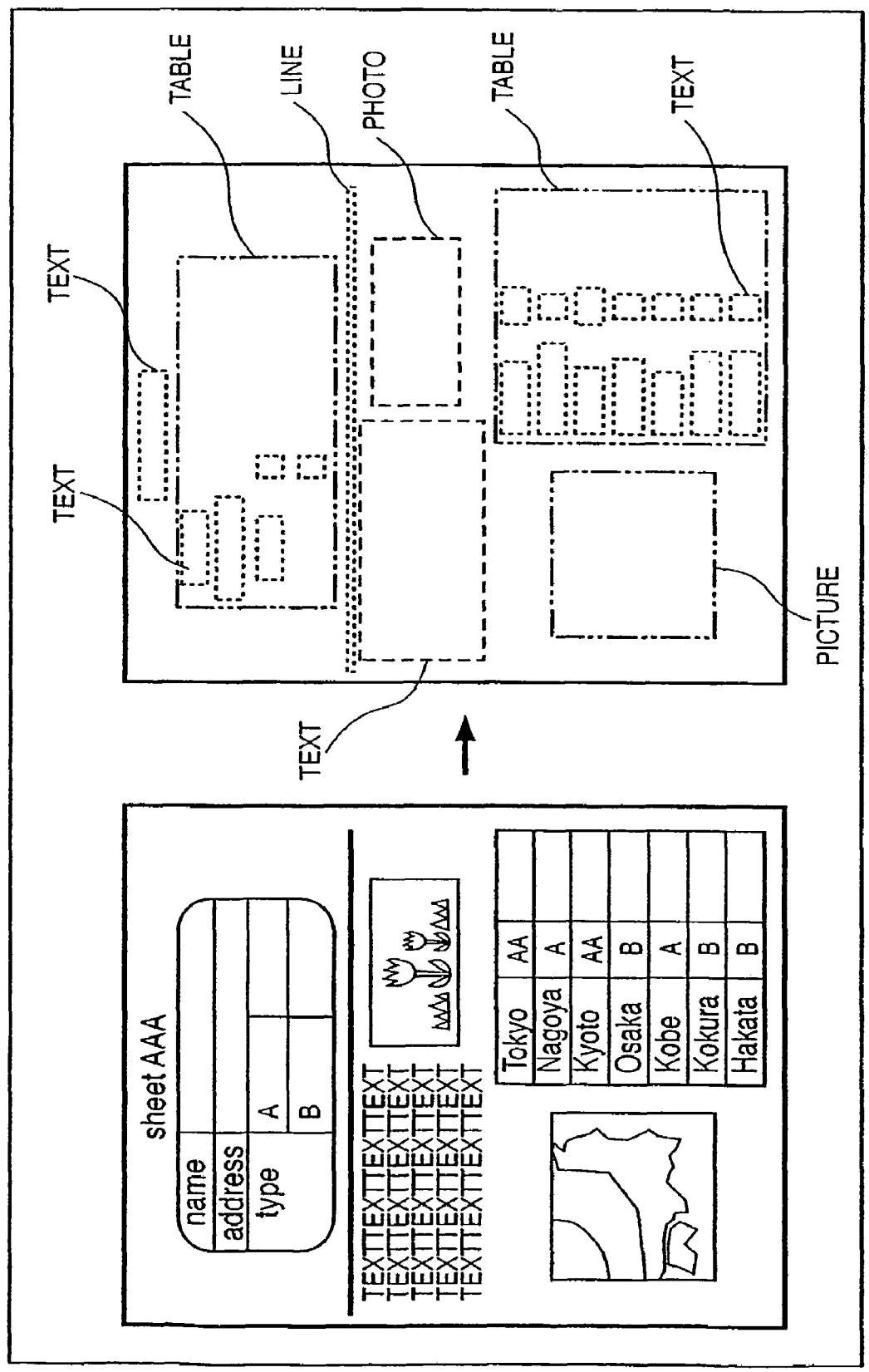
FIG. 7 is a view for explaining the processing contents of block segmentation upon scanning a paper document.

In the block segmentation process (also called a block selection process), scanned image data for one page (left side of FIG. 7) is recognized as clusters for respective objects, properties (text/graphic/photo/line/table, etc.) of respective blocks are determined, and the image data is segmented into regions having different properties, as shown in the right side of FIG. 7.

One embodiment of the block segmentation process will be described below.

An input image is binarized to a monochrome image, and a cluster of pixels bounded by black pixels is extracted by contour tracing. For a cluster of black pixels with a large area, contour tracing is made for white pixels in the cluster to extract clusters of white pixels. Furthermore, a cluster of black pixels is recursively extracted from the cluster of white pixels with a predetermined area or more.

The obtained clusters of black pixels are classified into regions having different properties in accordance with their sizes and shapes. For example, a pixel cluster which has an aspect ratio close to 1, and has a size that falls within a predetermined range is determined as that corresponding to a character. Furthermore, a part where neighboring characters regularly line up and can be grouped is determined as a text region. Also, a low-profile pixel cluster is categorized as a line region, a range occupied by black pixel clusters that include rectangular white pixel clusters which regularly line up is categorized as a table region, a region where pixel clusters with indeterminate forms are distributed is categorized as a photo region, and other pixel clusters with an arbitrary shape is categorized as a graphic region, and so forth.

FIG. 8 shows block information for each block obtained by the block segmentation process, and input file information used to manage blocks included in an input image.

These pieces of information for respective blocks are used to convert data into a format that can be edited by an application (this process will be referred to as vectorization hereinafter) or to conduct a search.

[Detection of Pointer Information]

A process for extracting the storage location of a file from image information (a process corresponding to step S43) will be described below.

Figure 9:
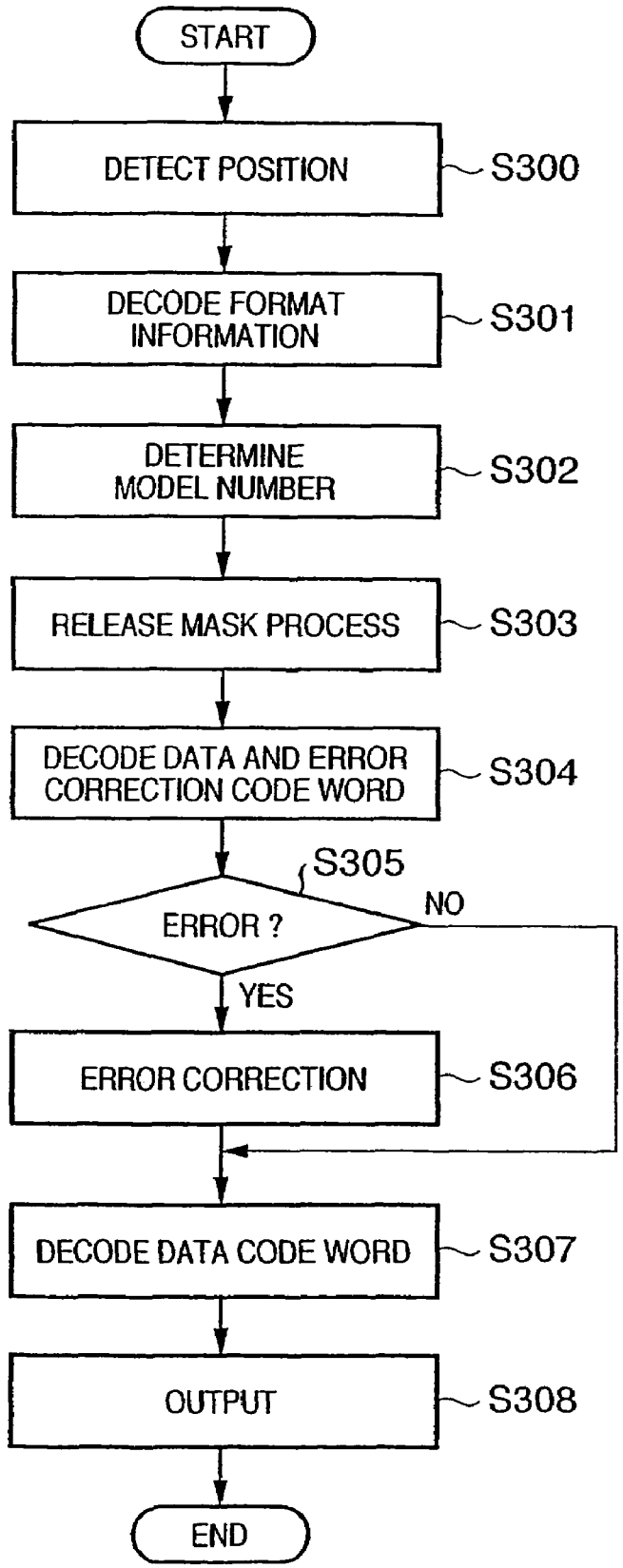
FIG. 9 is a flow chart showing a scanning/decoding processing sequence of a two-dimensional barcode in the embodiment of the present invention.
Figure 10:
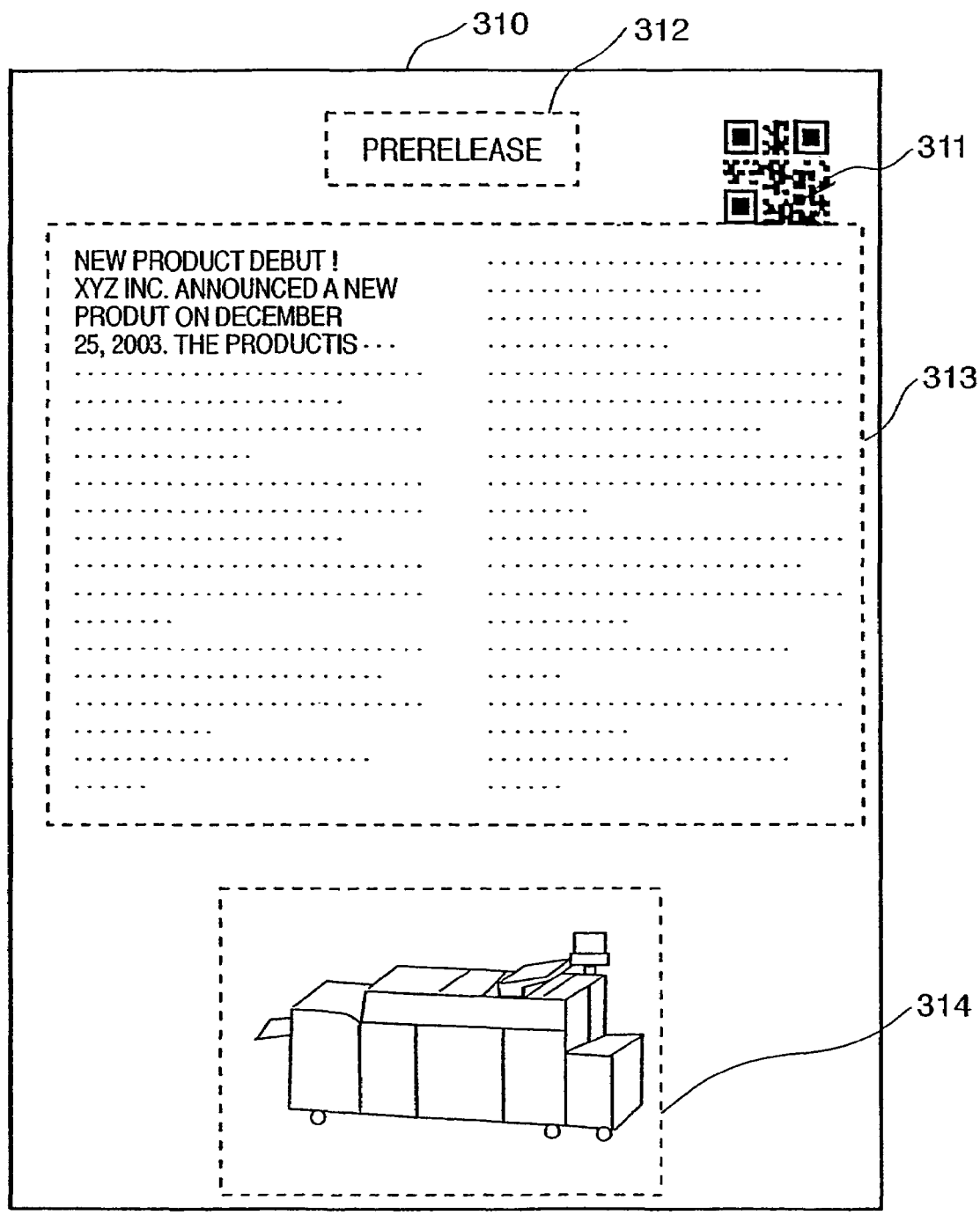
FIG. 10 shows an example of a document with a two-dimensional barcode in the embodiment of the present invention.

FIG. 9 is a flow chart showing a sequence for decoding a two-dimensional barcode (QR code symbol) appended into a document image, and outputting a data character string. FIG. 10 shows an example of a document 310 appended with a two-dimensional barcode.

By scanning this document 310 by the MFP 100, the data processing device in the MFP 100 executes various processes, and stores scanned image data for one page in the storage device 111. That image data is read out via the LAN 109, and is scanned by the CPU 30 to detect the position of a predetermined two-dimensional barcode symbol 311 on the basis of the aforementioned block segmentation process result. A position detection pattern of the QR code is detected (step S300) since it is made up of identical position detection element patterns located at three out of four corners of the symbol.

Next, format information that neighbors the position detection pattern is decoded to obtain an error correction level and mask pattern applied to the symbol (step S301).

After a model number of the symbol is determined (step S302), an encoded region bit pattern is XORed using the mask pattern obtained from the format information to release the mask process (step S303). Note that a symbol character is read in accordance with the layout rule corresponding to the model so as to decode message data and an error correction code word. (step S304).

It is detected if a decoded code includes an error (step S305). If any error is detected, the flow advances to step S306 to correct that error. A data code word is divided into segments on the basis of a mode indicator and character count indicator from the error-corrected data (step S307). Data characters are decoded on the basis of a specification mode, thus outputting the result (step S308).

Note that data to be encoded in the two-dimensional barcode represents address information (pointer information) of the corresponding file, which is formed of path information including a file server name and file name. Or the address information is formed of a URL to the corresponding file.

In this embodiment, the document 310 appended with the pointer information using the two-dimensional barcode has been described. Alternatively, pointer information may be recorded using a character string. In this case, a block of a character string according to a predetermined rule (e.g., a text block located at a predetermined position) is detected by the above block selection process, and characters of the character string that indicates the pointer information undergo character recognition, thus obtaining the address information of the original file.

Also, pointer information can be assigned by embedding information in the character spacings by applying imperceptible modulation to, e.g., the spacings between neighboring characters in a character string of a character block 312 or 313 of the document 310 shown in FIG. 10. For example, when the character spacings are detected upon executing a character recognition process (to be described later), pointer information can be obtained. Also, pointer information can be assigned as a invisible digital watermark in a natural image 314.

[File Search Based on Pointer Information]

A file search process based on the pointer information (a process corresponding to step S45) will be described below using FIG. 11.

A file server is specified based on an address included in the pointer information (step S400).

As has been already explained above, the file server indicates the document management server in this embodiment, but may be the client PC in some cases or the MFP 100 if an image storage/management function is appended to the MFP 100.

Note that the address is a URL or path information including a server name and file name.

After the file server can be specified, the address is transferred to the file server (step S401).

Upon reception of the address, the file server searches for a corresponding file (step S402). If no file is found (No in step S403), the file server sends a message that advises accordingly to the management PC.

On the other hand, if a file is found (Yes in step S403), that file is transferred to the request source (management PC) (step S408), as described above.

[File Search Process]

Figure 13A:
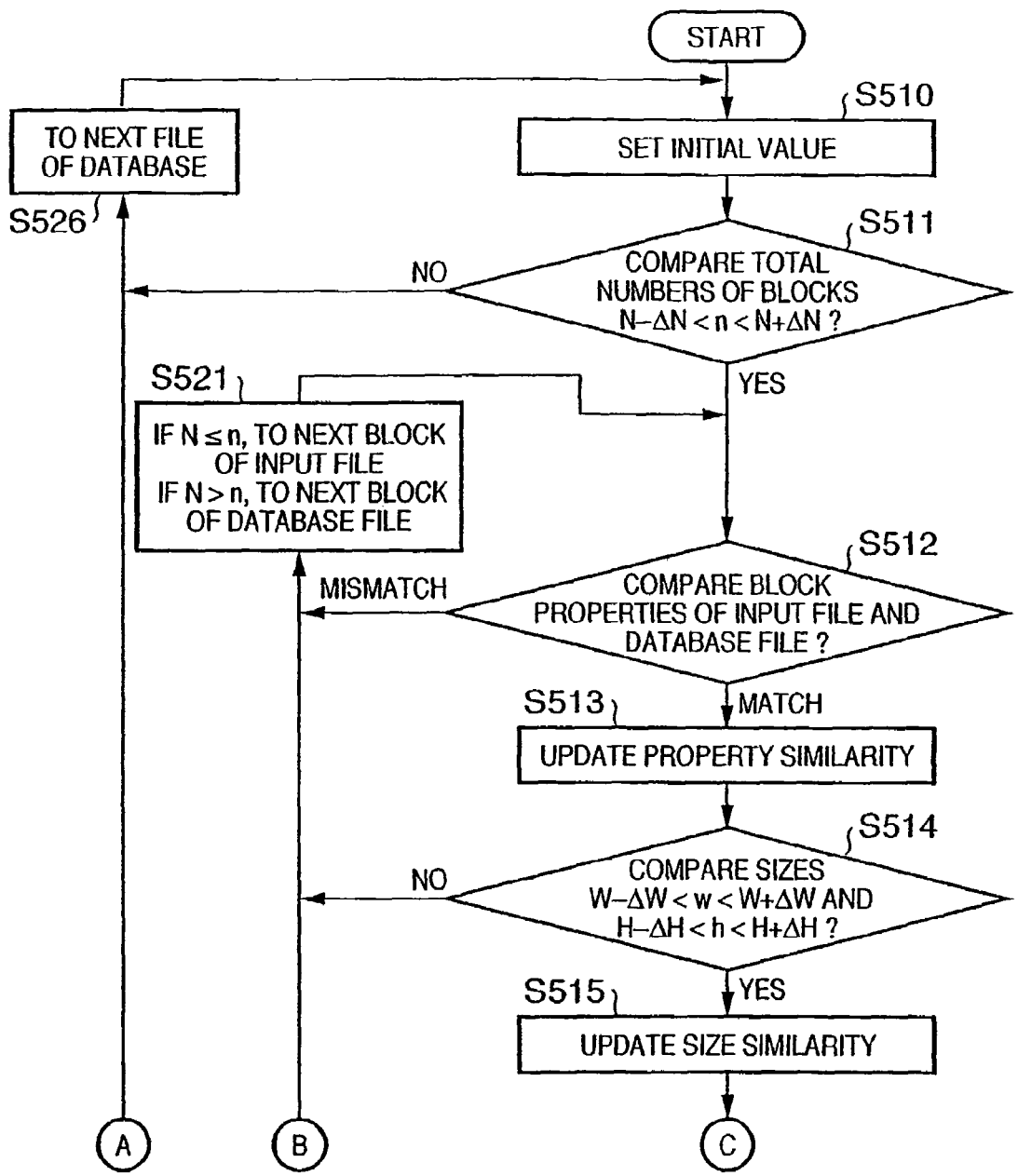
FIGS. 13A and 13B are flow charts showing a layout search processing sequence on the basis of the layout of a scanned document in the embodiment of the present invention.
Figure 13B:
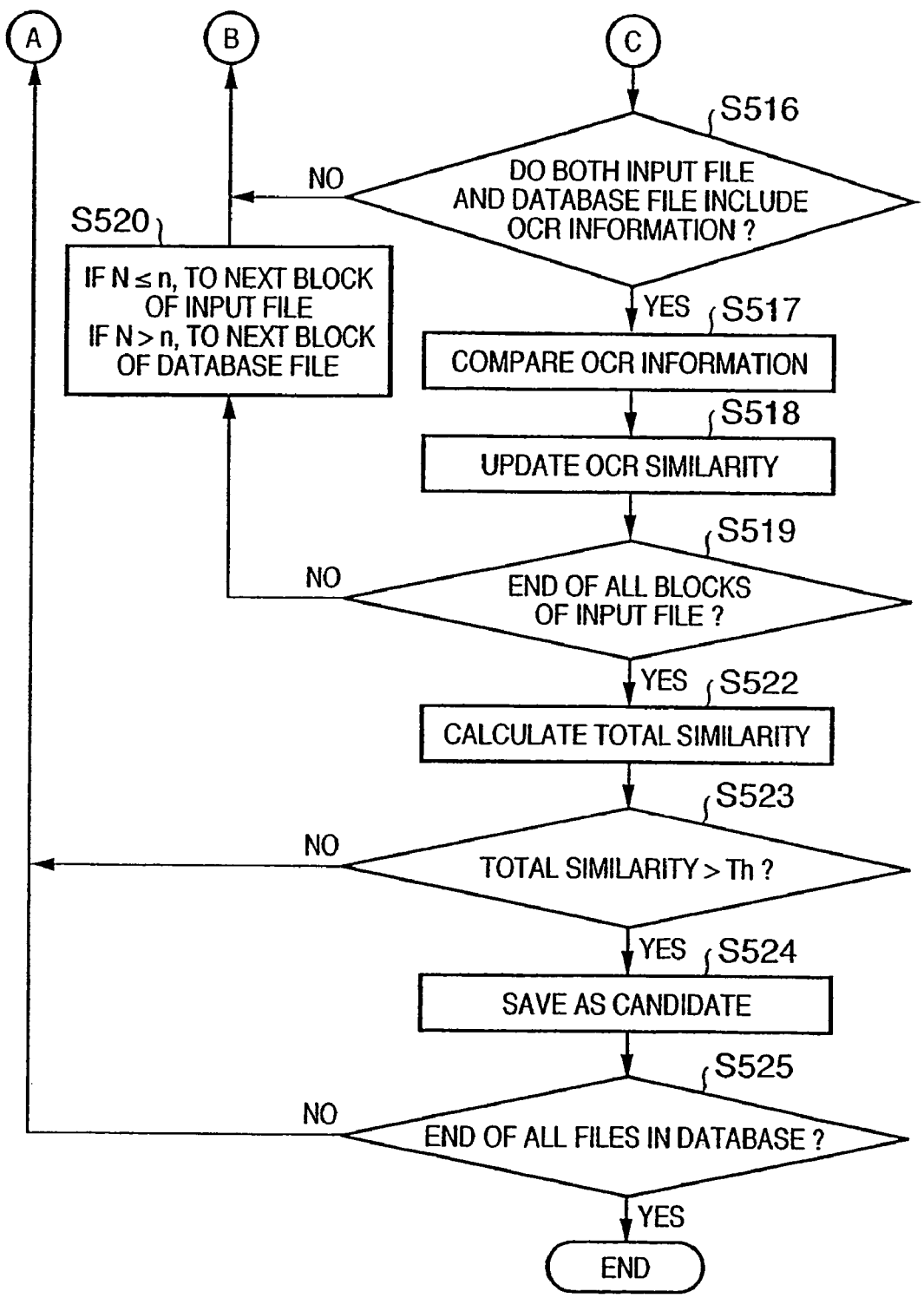

A search process based on the layout positions of blocks generated by block segmentation (a process corresponding to step S51) will be described below with reference to the flow charts of FIGS. 13A and 13B. That is, this process is done if an input document image has no pointer information, if pointer information is available but no digital file is found, or if a digital file is an image file.

A case will be described below wherein blocks extracted by block segmentation have information (block information, input file information) shown in FIG. 8.

As the information contents, a property, coordinate position, width and height, and availability of OCR information are exemplified. The property categorizes each block into one of text, line, photo, picture, table, and the like. For the sake of simplicity, blocks are arranged in ascending order of coordinate X. That is, in FIG. 8, X1<X2<X3<X4<X5<X6, and respective blocks are respective named as blocks 1, 2, 3, 4, 5, and 6. The total number of blocks indicates that included in an input image for one page, and is "6" in FIG. 8. The processing sequence for conducting a layout search of files similar to an input file from the database using these pieces of information will be described below with reference to the flow charts of FIGS. 13A and 13B.

In the flow of these flow charts, a plurality of pieces of information which are scanned by the MFP 100 and are obtained by the block segmentation process are compared in turn with that of the same type in the database 105.

In step S510, similarity levels and the like (to be described later) are initialized. In step S511, the total numbers of blocks are compared. If YES in step S511, respective pieces of information of blocks in files are compared in turn. Upon comparing information of blocks, property, size, and OCR similarity levels are calculated in steps S513, S515, and S518, and a total similarity level is calculated based on these levels in step S522. Since a method of calculating each similarity level can use a known technique, a description thereof will be omitted. If it is determined in step S523 that the total similarity level is higher than a pre-set threshold value Th, that file is determined as a similar candidate in step S524. In FIGS. 13A and 13B, N, W, and H are respectively the total number of blocks, each block width, and each block height in an input document image, and ΔN, ΔW, and ΔH are values which consider errors with reference to the block information of the input file. Also, n, w, and h are respectively the total number of blocks, each block width, and each block height in a file stored in the database. Although not shown, position information X, position information Y, and the like may be compared upon comparing sizes in step S514.

The aforementioned search process is repeated for all data stored in the database 105, and database files which have similarity levels higher than the threshold value Th and are saved as candidates (step S524) are displayed as thumbnail images or the like (step S52). If an operator must select one of a plurality of candidates, a file is specified by the operator's input operation.

[Vectorization Process]

A process for vectorizing image data (a process corresponding to step S54) will be described in detail below.

In this embodiment, user interfaces used to set processing methods in correspondence with the types of segment blocks are prepared. Vectorization processes are made according to the setups on these user interfaces.

For example, for a block of a text region, a "vector data", "binary image", or "multi-valued image" can be exclusively set, and ON/OFF of "append OCR information" can be set.

Figure 23:
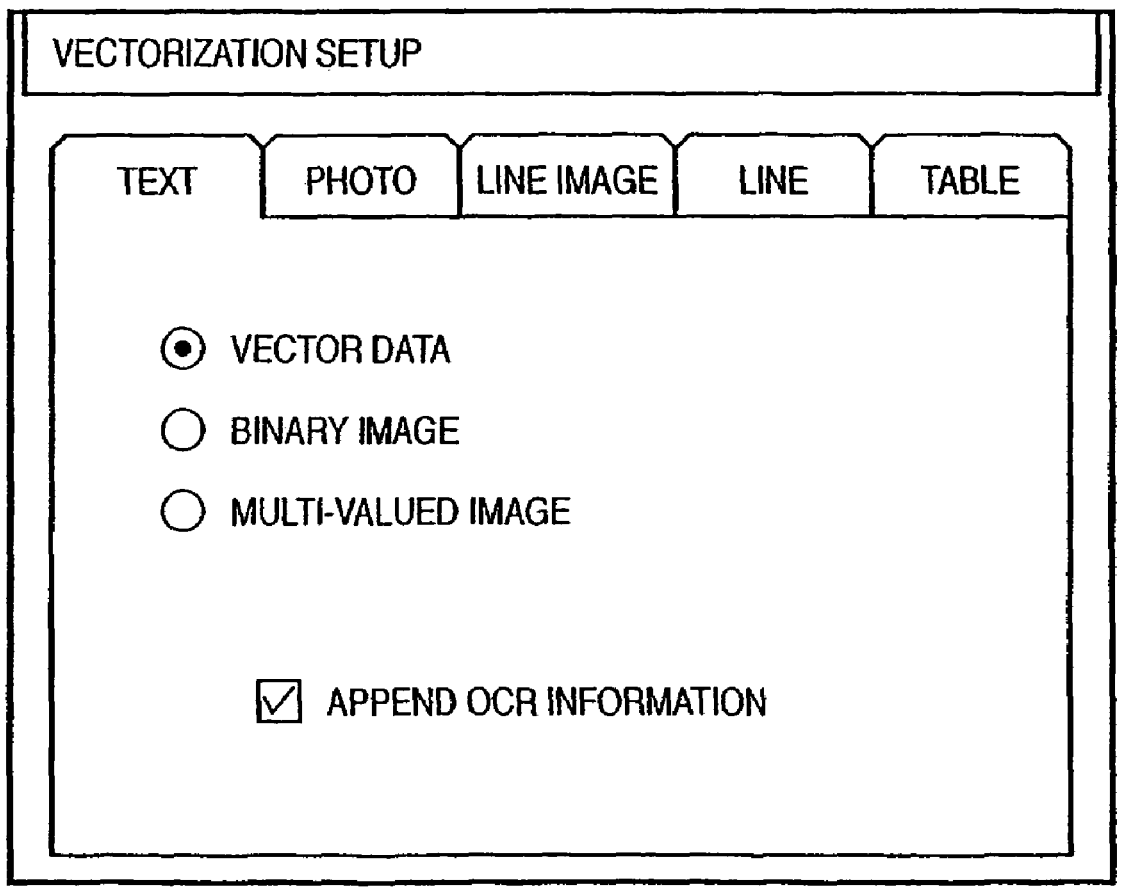
FIG. 23 shows an example of a setup window for a region in the embodiment of the present invention.

When "vector data" is selected and set, "vectorization based on outlines of character images", "vectorization based on OCR results and outline data for each character type", "automatic process switching according to a recognition ratio", and the like can be further selected and set as a vectorization execution method (not shown in FIG. 23), as described above.

Figure 24:
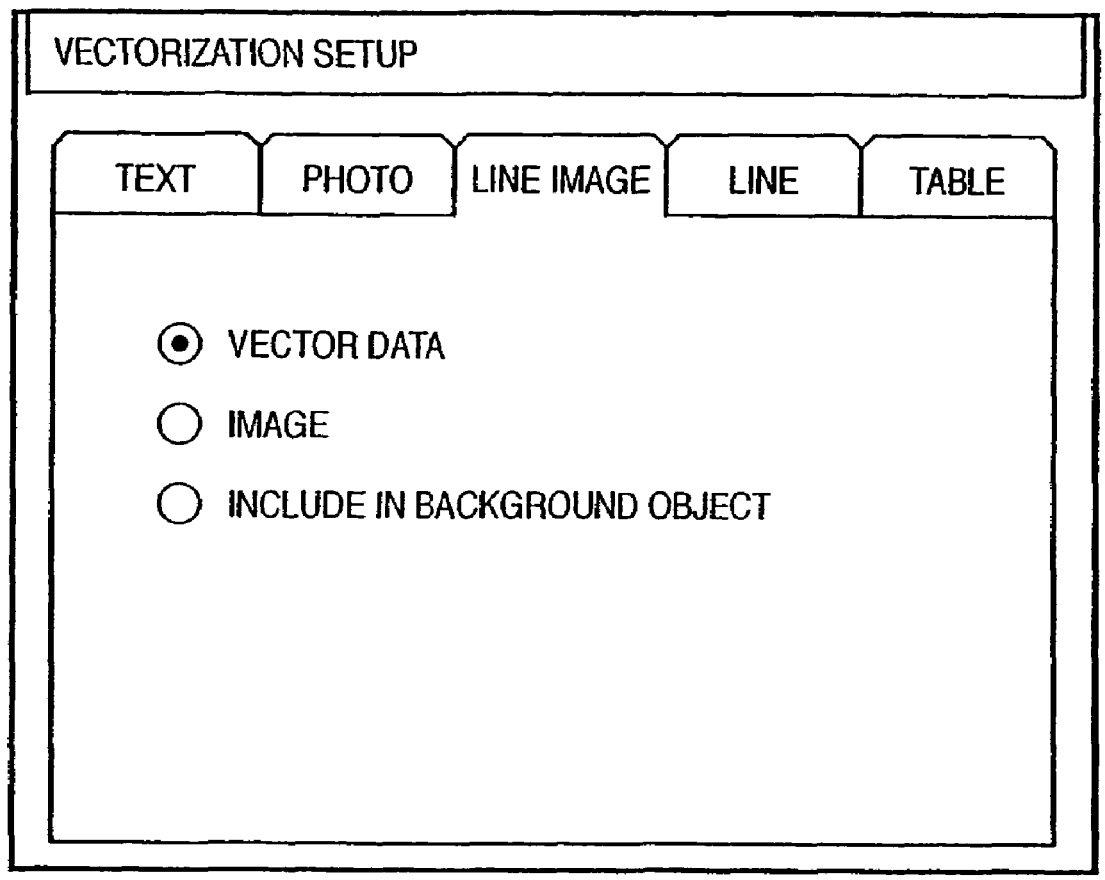
FIG. 24 shows an example of a setup window for a region in the embodiment of the present invention.
Figure 25:
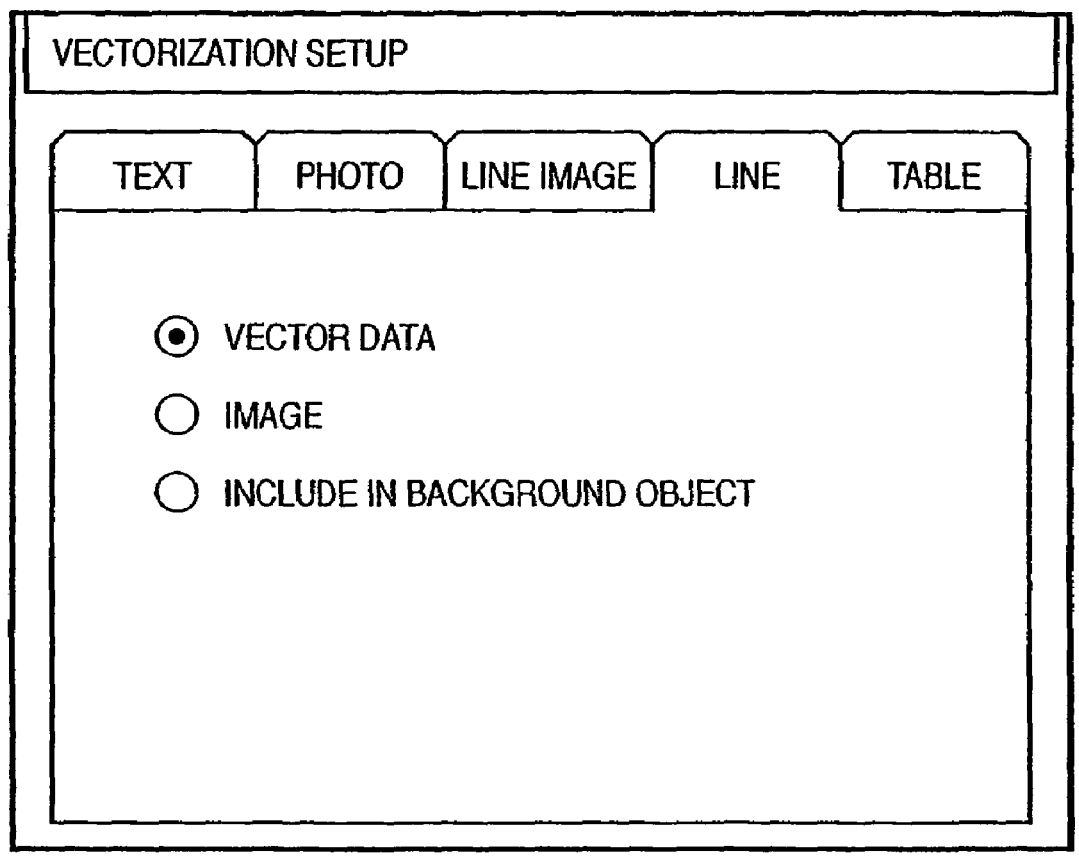
FIG. 25 shows an example of a setup window for a region in the embodiment of the present invention.

For a block of a line image region (a region of a graphic or the like formed of lines) or a block of a line, "vector data", "image", or "include in background object" can be exclusively set, as shown in FIG. 24 or 25.

Figure 26:
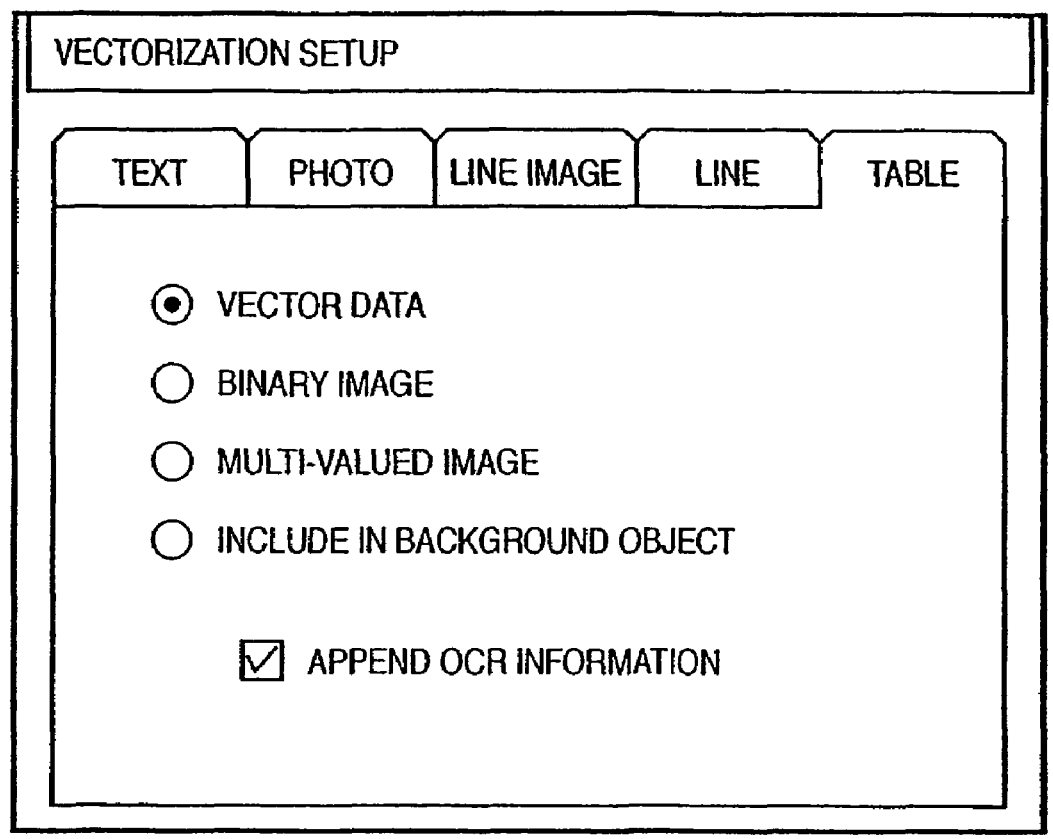
FIG. 26 shows an example of a setup window for a region in the embodiment of the present invention.

For a block of a table region, "vector data", "binary image", "multi-valued image", or "include in background object" can be exclusively set, and ON/OFF of "append OCR information" can be set, as shown in FIG. 26. However, when this block is included in a background object, "append OCR information" is always OFF.

Figure 27:
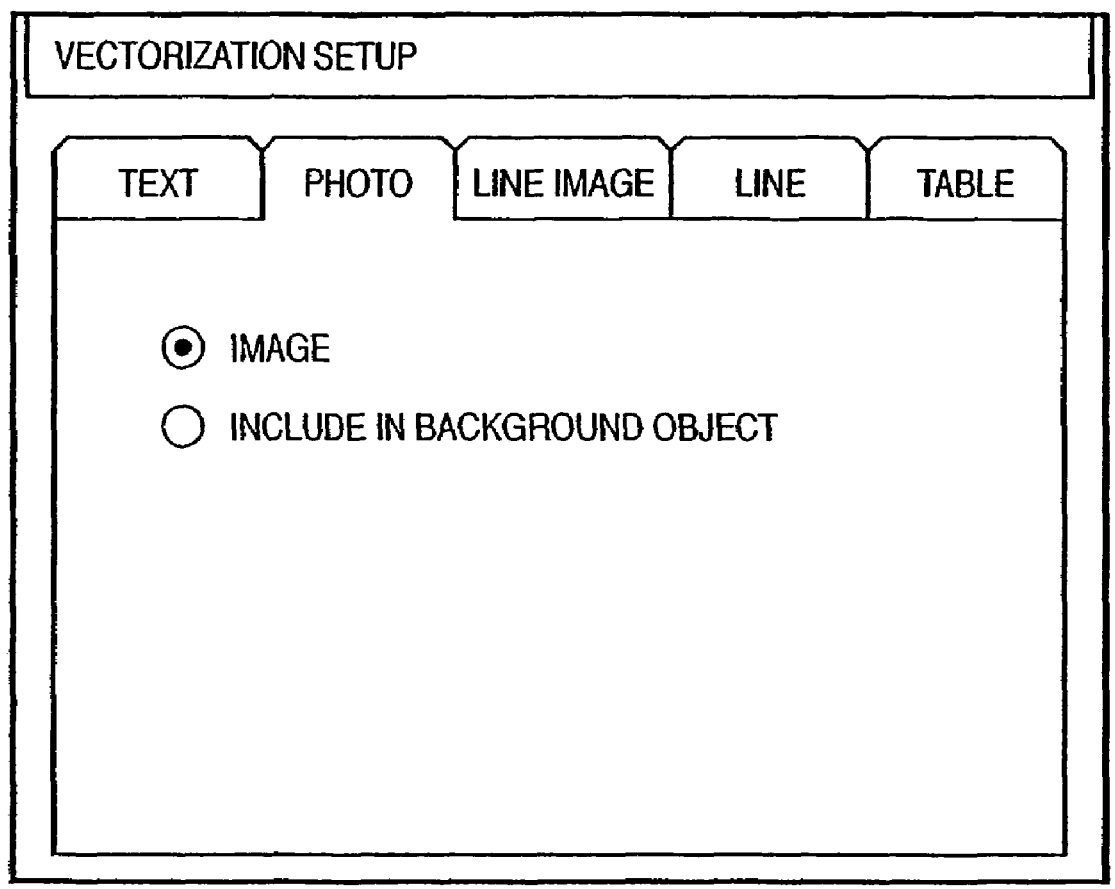
FIG. 27 shows an example of a setup window for a region in the embodiment of the present invention.

Furthermore, for an image region such as a photo or the like, "image" or "include in background object" can be exclusively set, as shown in FIG. 27.

As default setups, assume that "vector data" (vectorization based on outlines) and "append OCR information" are set for a text region, "vector data" is set for a line image region and line region, "vector data" and "append OCR information" are set for a table region, and "image" is set for a photo region. When the user inputs a setup change instruction, the user interfaces shown in FIGS. 23 to 27 are called to set desired values. These setups are written in a nonvolatile storage area of, e.g., a hard disk or the like, which can hold contents even after power OFF, and are read out from the hard disk and automatically set upon the next and subsequent startup processes. That is, once these setups are made, processes are made according to these setup contents unless they are changed.

Details of the processes according to the contents using the aforementioned interfaces will be described below. For example, if "binary image" is set for a text region, that text region is binarized to obtain the result of the vectorization process; if "multi-valued image" is set, that text region is compressed by, e.g., JPEG or the like to obtain the result of the vectorization process. On the other hand, if "binary image" or "multi-valued image" is set, and "append OCR information" is OFF, image data alone is output as the result of the vectorization process without appending any character recognition result (by skipping a character recognition process); if "append OCR information" is ON, a <<character recognition>> process is executed to output the character code, character size, and position of the recognition result, and the image data as the vectorization results. If a setup indicates "vector data", vectorization is made according to the aforementioned setup. In this case, if "append OCR information" is ON, a character code and vector data are output as the results of the vectorization process; if it is OFF, vector data alone is output as the result of the vectorization process.

For a line image/line region, the setup is similarly read out, and the process is made according to the readout setup.

For example, when "vector data" is set, an outline of a line/line image in that block is extracted to generate an outline vector based on the outline, thus attaining the vectorization process, i.e., converting the data in that block into re-usable vector data. On the other hand, when "image" is set, that region is extracted as one image data, and undergoes a compression process and the like, thus obtaining the vectorization result. When "include in background object" is set, the vectorization process of that region is skipped, and the region is handled as a part of a background object.

For a table region, the setup is similarly read out, and the process is made according to the readout setup.

For example, when "vector data" is selected and set, outlines of ruled lines, characters, and like are extracted to generate outline vectors based on the outlines, thus attaining the vectorization process. Note that additional setups may be allowed to execute "a vectorization process based on outlines" for ruled lines, and to execute the same vectorization process as that for the aforementioned text region. When "append OCR information" is ON, character codes and vector data are output as the results of the vectorization process; when it is OFF, vector data alone is output as the vectorization result. When "binary image" or "multi-valued image" is set, and "append OCR information" is OFF, only image data of that region is output as the result of the vectorization process without appending any character recognition result (without any character recognition process). On the other hand, when "append OCR information" is ON, a <<character recognition>> process is executed to output the character code, character size, and position of the recognition result, and the image data as the vectorization results. When "include in background object" is set, the corresponding region is handled as a part of a background object without any vectorization process.

For a photo region, the setup is similarly read out, and the process is made according to the readout setup. For example, when "image" is set, that region is compressed by, e.g., JPEG. When "include in background object" is set, the corresponding region is handled as a part of a background object.

[Character Recognition]

In a character recognition process, an image extracted for each character is recognized using one of pattern matching methods to obtain a corresponding character code. In this recognition process, an observation feature vector obtained by converting a feature acquired from a character image into a several-ten-dimensional numerical value string is compared with a dictionary feature vector obtained in advance for each character type, and a character type with a shortest distance is output as a recognition result. Various known methods are available for feature vector extraction. For example, a method of dividing a character into a mesh pattern, and counting character lines in respective meshes as line elements depending on their directions to obtain a (mesh count)-dimensional vector as a feature is known.

When a text region extracted by the block segmentation process undergoes character recognition, the writing direction (horizontal or vertical) is determined for that region, lines are extracted in the corresponding direction, and character images are then extracted. Upon determining the writing direction (horizontal or vertical), horizontal and vertical projections of pixel values in that region are calculated, and if the variance of the horizontal projection is larger than that of the vertical projection, that region can be determined as a horizontal writing region; otherwise, that region can be determined as a vertical writing region. Upon decomposition into character strings and characters, in case of horizontal writing, lines are extracted using the horizontal projection, and characters are extracted based on the vertical projection for the extracted line. In case of a vertical writing text region, the relationship between the horizontal and vertical parameters may be exchanged. At this time, a character size can be detected.

[Font Recognition]

Dictionaries used in character recognition are prepared in correspondence with the number of font types, and a font type is output together with a character code upon matching, thus recognizing the font of a character. That is, when a dictionary of feature vector information with a shortest distance can be specified by character recognition, that dictionary is determined as a font of the corresponding character image.

[Vectorization of Character Based on OCR Result]

Using a character code and font information obtained by the character recognition and font recognition, and outline data prepared for each character, information of a character part is converted into vector data. If a scanned image has color characters, the color of each character is extracted, and is recorded together with vector data.

With the above processes, image information which belongs to a text block can be converted into vector data with a nearly faithful shape, size, and color on the basis of the OCR result.

[Vectorization Based on Outline]

When vectorization based on an outline of a character image is set for a text region, or when it is set to execute a vectorization process in a line image (graphic), line, or table region, information of that region is converted into vector data on the basis of outlines of extracted pixel clusters, as will be described below.

Figure 14:
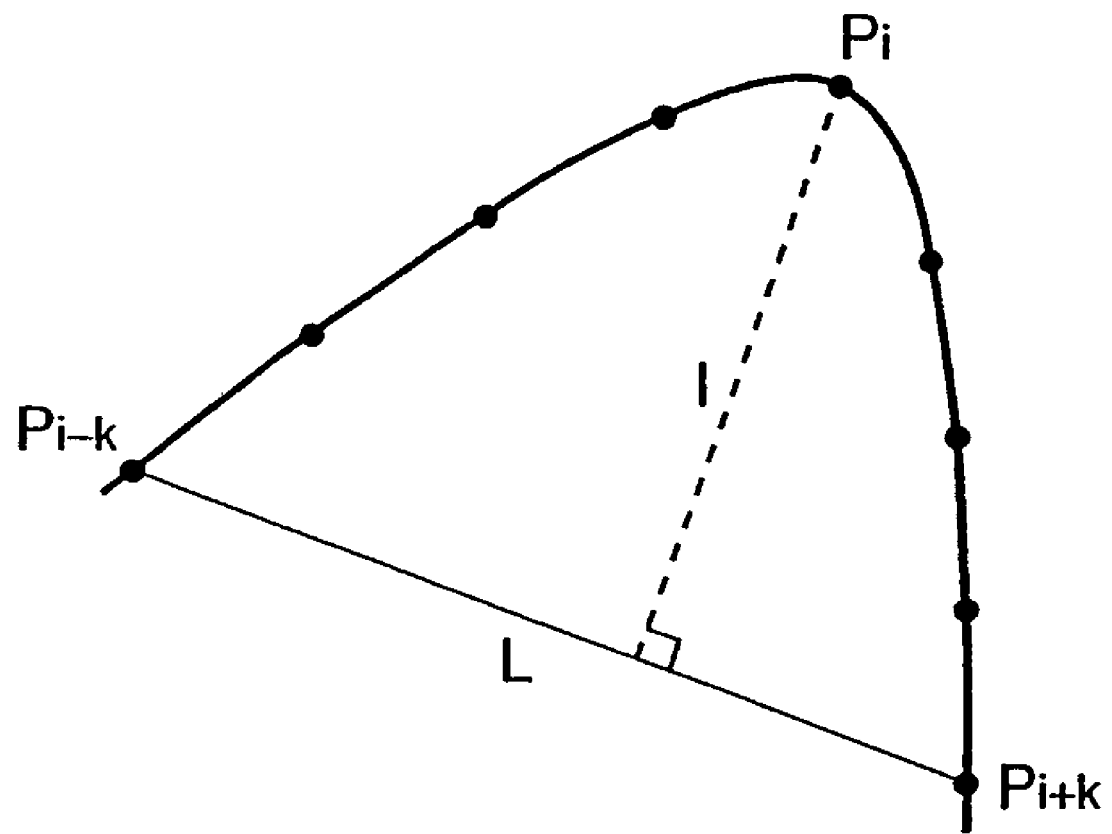
FIG. 14 is a view for explaining the contents of a vectorization process of a line segment in the embodiment of the present invention.

More specifically, a point sequence of pixels which form an outline is divided into sections at a point which is considered as a corner, and each section is approximated by a partial line or curve. The corner means a point corresponding to a maximal curvature, and the point corresponding to the maximal curvature is obtained as a point where a distance between an arbitrary point Pi and a chord which is drawn between points Pi−k and Pi+k separated k points from the point Pi in the left and right directions becomes maximal, as shown in FIG. 14. Furthermore, let R be the chord length/arc length between Pi−k and Pi+k. Then, a point where the value R is equal to or smaller than a threshold value can be considered as a corner. Sections obtained after division at each corner can be vectorized using a method of least squares or the like with respect to a point sequence for a line, and a tertiary spline function or the like for a curve.

When an object has an inside outline, it is similarly approximated by a partial line or curve using a point sequence of a white pixel outline extracted by block selection.

As described above, using partial line approximation, an outline of a graphic with an arbitrary shape can be vectorized. When an original document has a color image, the color of a graphic is extracted from the color image and is recorded together with vector data.

Figure 15:
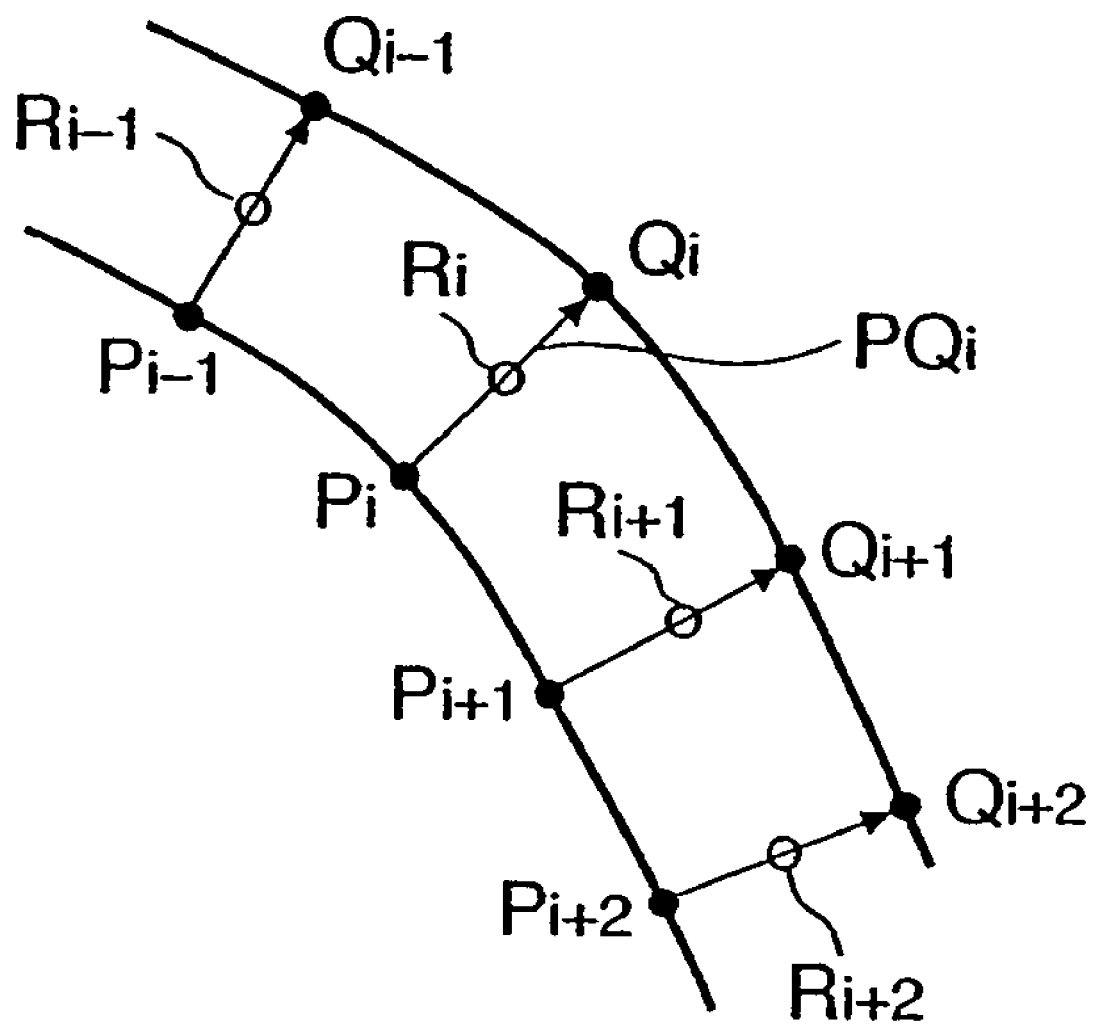
FIG. 15 is a view for explaining the contents of a vectorization process of a line segment in the embodiment of the present invention.

As shown in FIG. 15, when an outside outline is close to an inside outline or another outside in a given section, two outlines may be combined to be expressed as a line with a given width. More specifically, lines are drawn from respective points Pi on a given outline to points Qi on another outline, each of which has a shortest distance from the corresponding point. When the distances PiQi maintain a constant value on the average, the section of interest is approximated by a line or curve using middle points Ri as a point sequence, and the average value of the distances PiQi is set as a width of that line or curve. A line or a table ruled line as a set of lines can be efficiently vectorized as a set of lines having a given width, as described above.

[Graphic Recognition]

A process for grouping vectorized partial lines for each graphic object after the outline of a graphic with an arbitrary shape is vectorized, as described above, will be described below.

Figure 16:
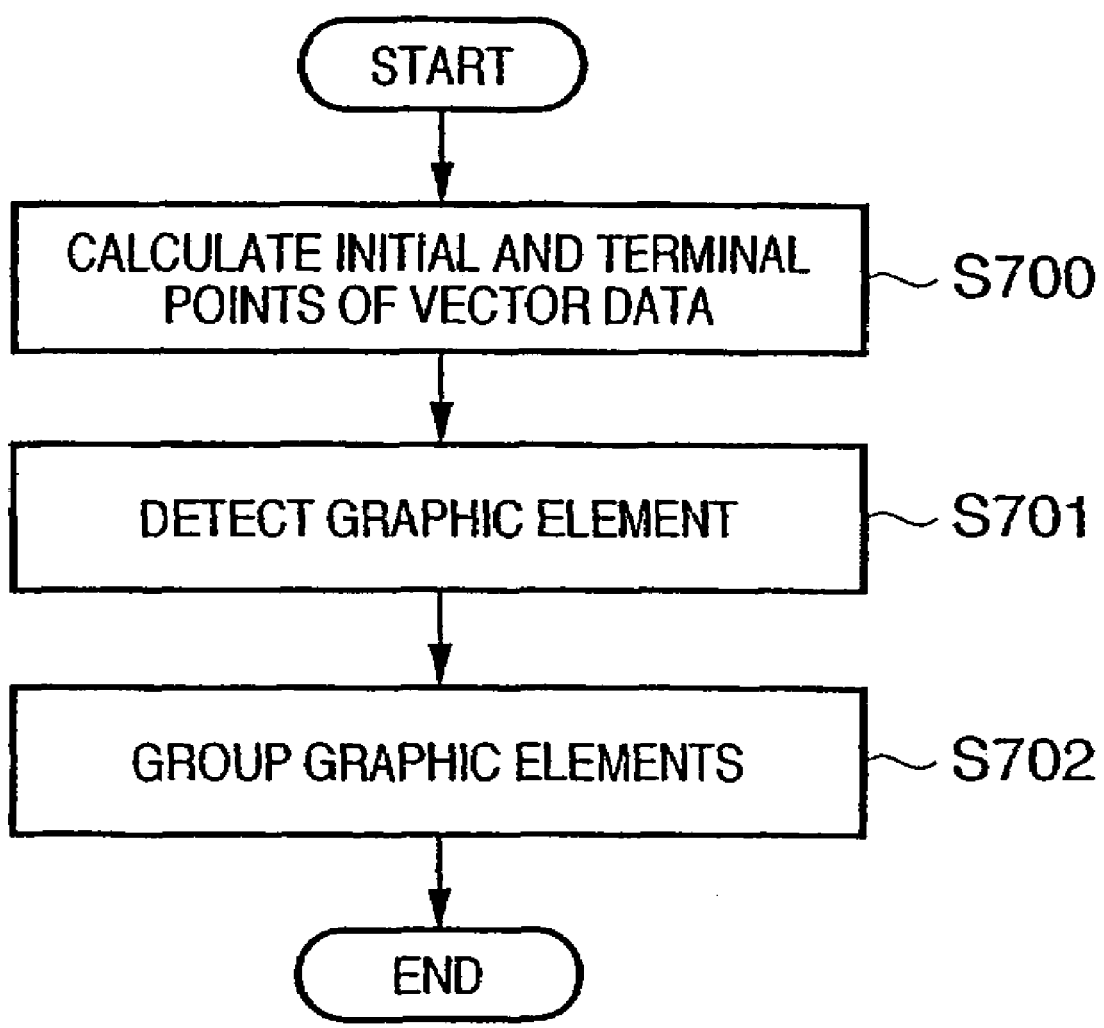
FIG. 16 is a flow chart showing a schematic processing sequence of a grouping process in the embodiment of the present invention.

FIG. 16 shows the processing sequence until vector data are grouped for each graphic object.

Initial and terminal points of each vector data are calculated (step S700). Using the initial point information and terminal point information of respective vectors, a graphic element is detected (step S701). Detecting a graphic element is to detect a closed graphic formed by partial lines. Detection is made by applying the principle that each vector which forms a closed shape has vectors coupled to its two ends. Next, other graphic elements or partial lines present in the graphic element are grouped to set a single graphic object (step S702). If other graphic elements or partial lines are not present in the graphic element, that graphic element is set as a graphic object.

Figure 17:
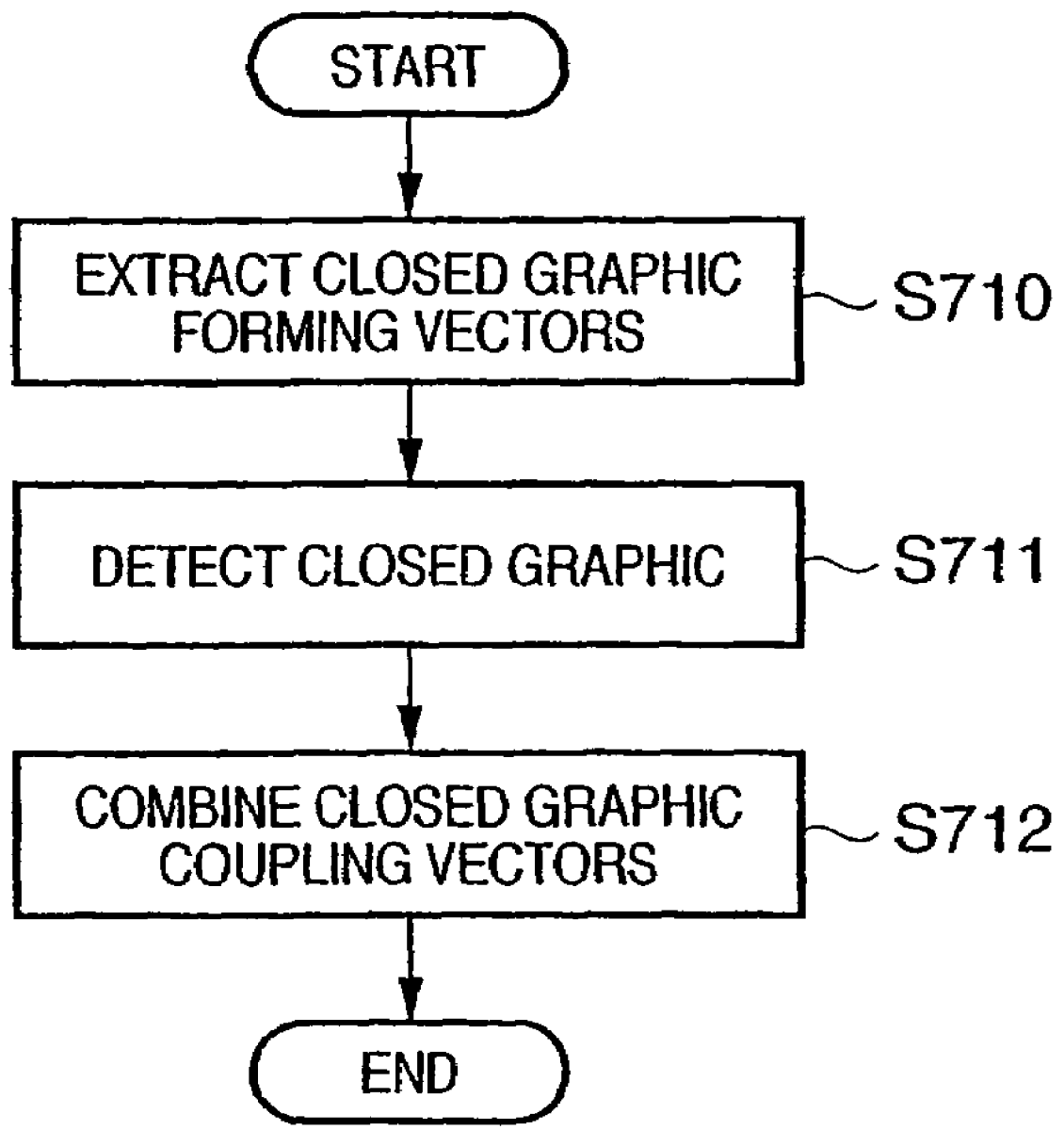
FIG. 17 is a flow chart showing a detection processing sequence of graphic elements in the embodiment of the present invention.

FIG. 17 is a flow chart showing the process for detecting a graphic element. Closed graphic forming vectors are extracted from vector data by excluding unwanted vectors, two ends of which are not coupled to other vectors (step S710). An initial point of a vector of interest of the closed graphic forming vectors is set as a start point, and vectors are traced clockwise in turn. This process is made until the start point is reached, and all passing vectors are grouped as a closed graphic that forms one graphic element (step S711). Also, all closed graphic forming vectors present in the closed graphic are grouped. Furthermore, an initial point of a vector which is not grouped yet is set as a start point, and the above process is repeated. Finally, of the unwanted vectors excluded in step S710, those which join the vectors grouped as the closed graphic in step S711 are detected and are grouped as one graphic element (step S712).

With the above process, a graphic block can be handled as an independently re-usable graphic object.

[Conversion Process to Application Data]

Figure 18:
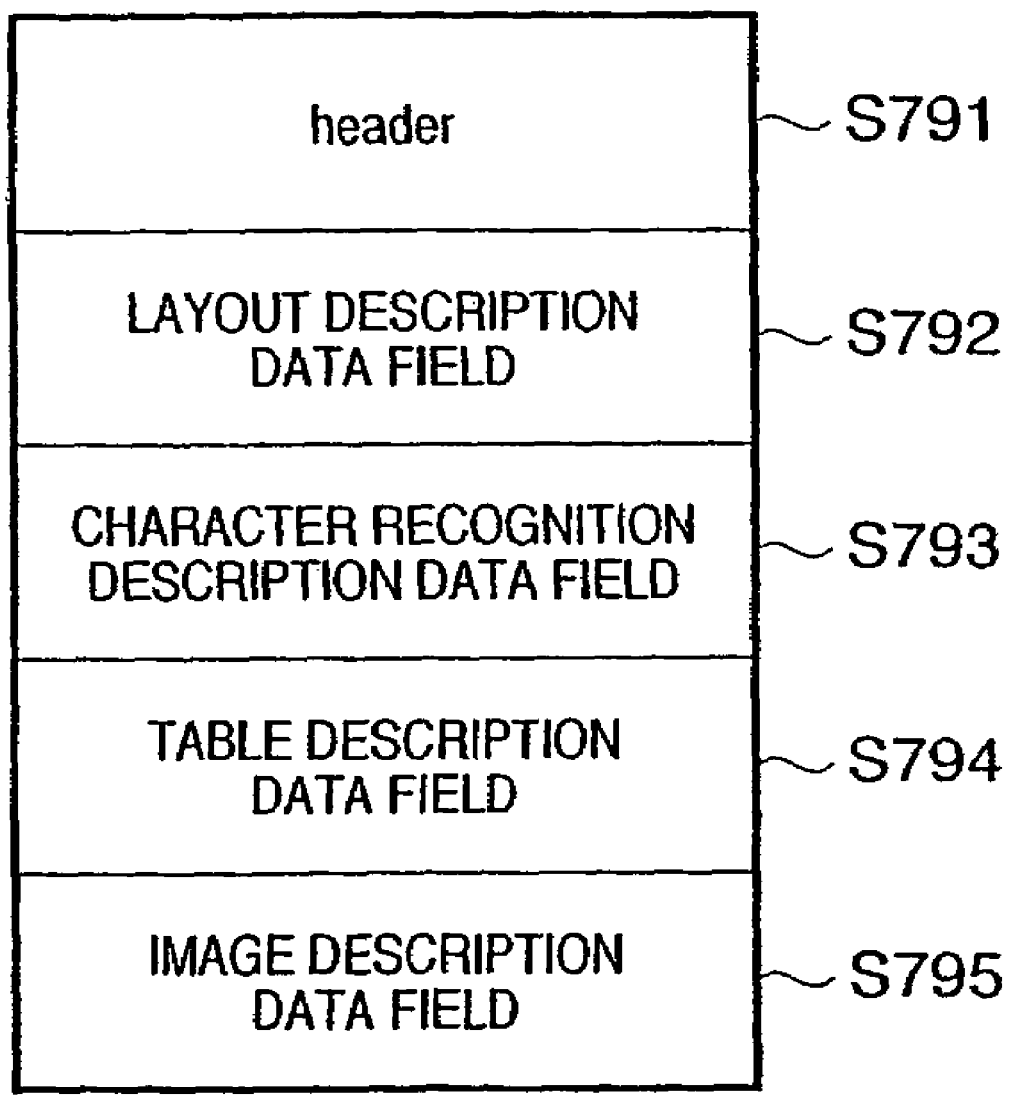
FIG. 18 shows the data structure of a DAOF.

The results of block segmentation and vectorization of image data for one page are converted into a file of an intermediate data format. Such intermediate data format will be referred to as a document analysis output format (DAOF) hereinafter. FIG. 18 shows the data structure of the DAOF.

Referring to FIG. 18, reference numeral 791 denotes a Header which holds information associated with document image data to be processed. A layout description data field 792 holds property information and block address information of respective blocks which are recognized for respective properties such as TEXT (text), TITLE (title), CAPTION (caption), LINEART (line image), PICTURE (natural image), FRAME (frame), TABLE (table), and the like. A character recognition description data field 793 holds character recognition results obtained by executing character recognition of TEXT blocks such as TEXT, TITLE, CAPTION, and the like. A table description data field 794 stores details of the structure of TABLE blocks. An image description data field 795 stores vector data generated by the vectorization process of respective blocks (or image data when it is set to save these blocks as an image), image data of PICTURE blocks, and the like.

Such DAOF itself is often saved as a file in place of intermediate data. However, in the state of a file, a general document creation application cannot re-use individual objects. Hence, a process for converting the DAOF into application data will be described in detail below.

Figure 19:
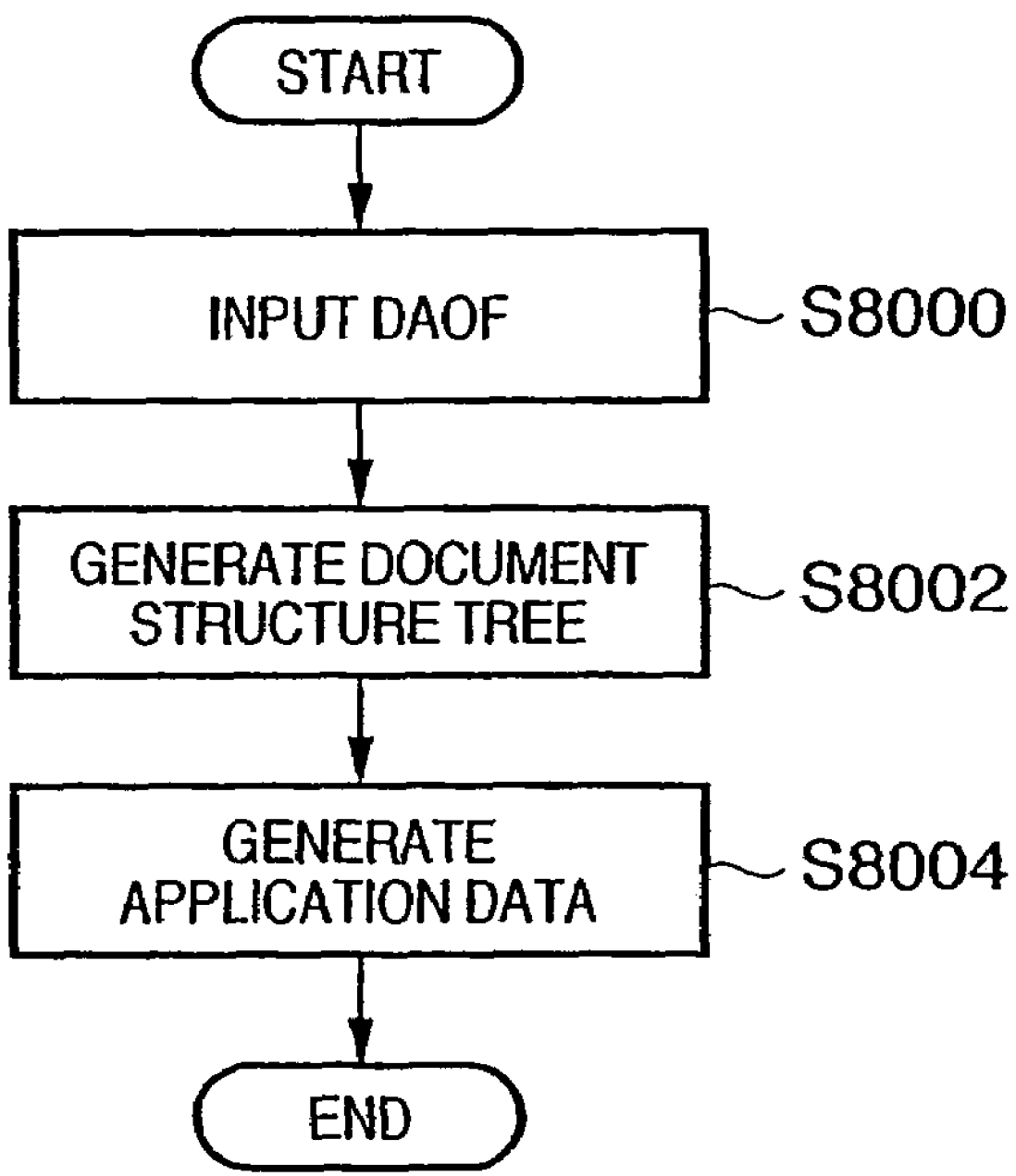
FIG. 19 is a flow chart showing an application data generation processing sequence in the embodiment of the present invention.

FIG. 19 shows the overall processing sequence of conversion into application data.

In step S8000, DAOF data is input. In step S8002, a document structure tree which serves as a basis of application data is generated. In step S8004, actual data in the DAOF are input based on the document structure tree, thus generating actual application data.

Figure 20:
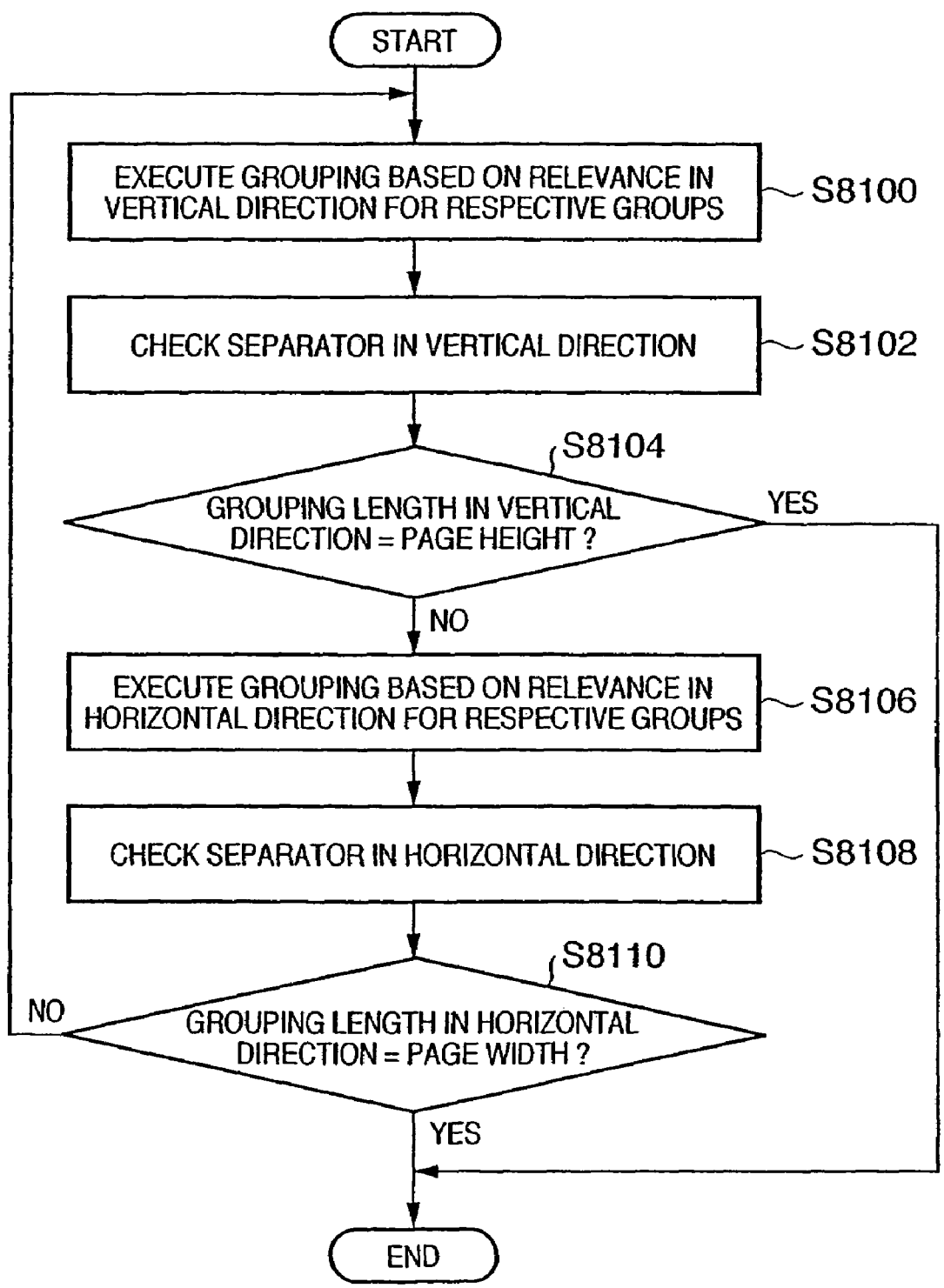
FIG. 20 is a detailed flow chart of a document structure tree generation process in step S8002 in FIG. 19.
Figure 21A:
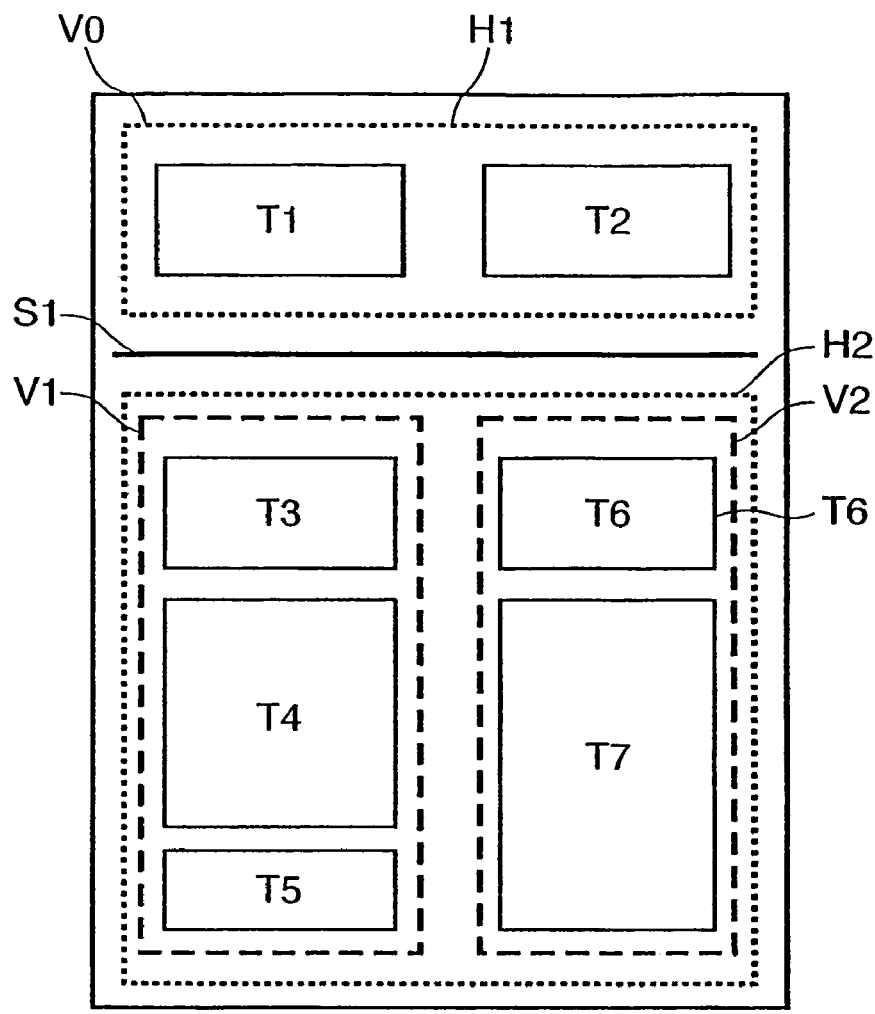
FIGS. 21A and 21B are views for explaining the structure of a document structure tree.
Figure 21B:
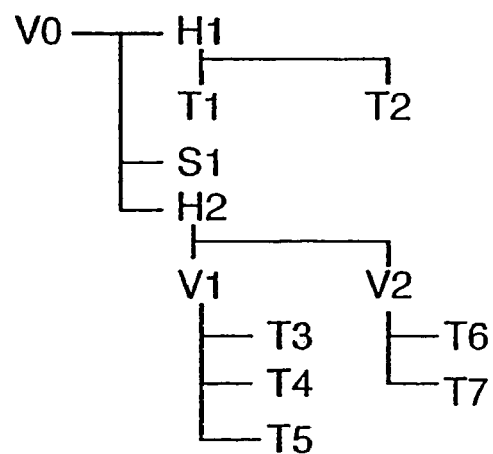

FIG. 20 is a detailed flow chart of the structure tree generation process in step S8002, and FIGS. 21A and 21B are explanatory view of a document structure tree. As a basic rule of the overall control, the flow of processes transits from a microblock (single block) to a macroblock (a set of blocks). In the description of FIG. 20, a block indicates a microblock and macroblock.

In step S8100, re-grouping is done for respective blocks on the basis of relevance in the vertical direction. Immediately after the flow starts, determination is made for respective microblocks. Note that relevance can be defined by checking if a distance between neighboring blocks is small, blocks have nearly the same block widths (heights in case of the horizontal direction), and so forth. Information of the distances, widths, heights, and the like can be extracted with reference to the DAOF.

FIG. 21A shows an actual page configuration, and FIG. 21B shows a document structure tree of that page.

As a result of the process in step S8100, T3, T4, and T5 are determined to form one group V1, T6 and T7 are determined to form one group V2, and these groups are generated as those which belong to an identical layer.

In step S8102, the presence/absence of a vertical separator is checked. Physically, a separator is an object which has a line property in the DAOF. Logically, a separator is an element which explicitly divides blocks in an application. Upon detection of a separator, a group is re-divided in the identical layer.

It is then checked in step S8104 using a group length if no more divisions are present. If the group length in the vertical direction agrees with a page height (a distance between the uppermost and lowermost ends of a plurality of blocks present in the page of interest), the document structure tree generation process ends.

In case of FIGS. 21A and 21B, groups V1 and V2 have no separator, and their group height does not agree with the page height. Hence, the flow advances to step S8106.

In step S8106, re-grouping is done for respective blocks on the basis of relevance in the horizontal direction. Definitions of relevance and its determination information are the same as those in the vertical direction.

In case of FIGS. 21A and 21B, T1 and T2 generate group H1, and V1 and V2 generate group H2. Groups H1 and H2 are generated as those which belong to an identical layer one level higher than V1 and V2.

In step S8108, the presence/absence of a separator in the horizontal direction is checked.

Since FIGS. 21A and 21B include separator S1, that separator is registered in a tree, thus generating layers H1, S1, and H2.

It is checked in step S8110 using a group length if no more divisions are present.

When the group length in the horizontal direction agrees with a page width (a distance between the leftmost and rightmost ends of a plurality of blocks present in the page of interest), the document structure tree generation process ends. Otherwise, the flow returns to step S8102 to repeat the processes from relevance check in the vertical direction in an upper layer by one level.

In case of FIGS. 21A and 21B, since the group length agrees with the page width, the process ends, and uppermost layer V0 that represents the entire page is finally appended to the document structure tree.

After the document structure tree is completed, application data is generated based on that information in step S8006.

A practical example in case of FIGS. 21A and 21B will be explained below. That is, since H1 includes two blocks T1 and T2 in the horizontal direction, it is output as two columns. After internal information of T1 (with reference to the DAOF, text as the character recognition result, image, and the like) is output, a new column is set, and internal information of T2 is output. After that, separator S1 is output.

Since H2 includes two blocks V1 and V2 in the horizontal direction, it is output as two columns. Internal information of V1 is output in the order of T3, T4, and T5, and a new column is set. Then, internal information of V2 is output in the order of T6 and T7. In this way, since the conversion process into application data can be done in the output order, for example, the converted application data can have a correct read order of text regions and the like.

[Appending of Pointer Information]

A pointer information appending process in step S48 in FIG. 5 will be described below.

Upon recording a stored document on a paper sheet, image data based on pointer information is additionally recorded. When the printed document is copied again, original file data can be easily acquired, and a high-quality print can be obtained.

Figure 22:
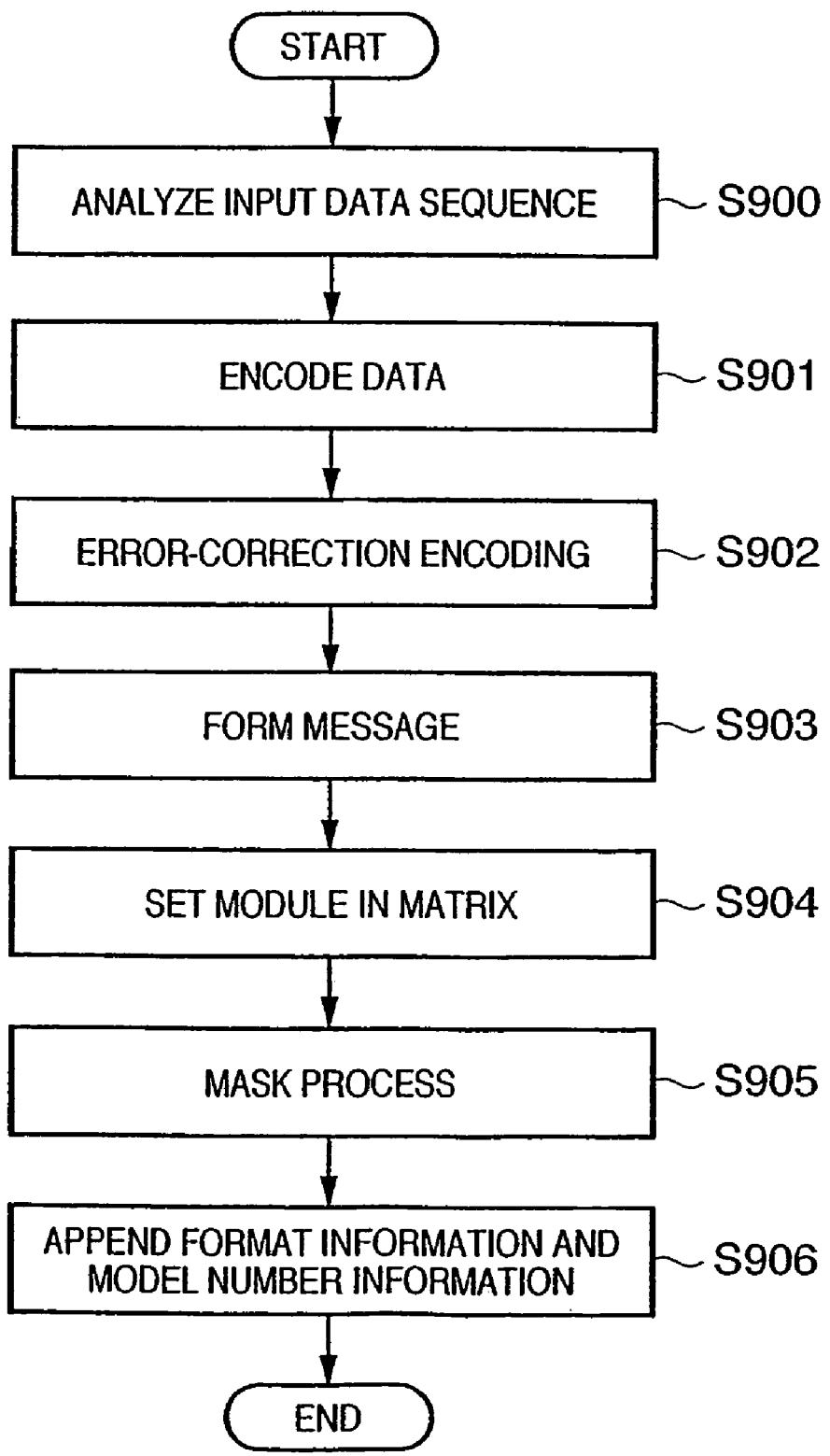
FIG. 22 is a flow chart showing the sequence for encoding pointer information using a two-dimensional barcode, and appending the encoded pointer information into an image in the embodiment of the present invention.

FIG. 22 is a flow chart showing the sequence for encoding (imaging) a data character string as pointer information by a two-dimensional barcode (QR code symbol: JIS X0510), and appending the converted barcode into an image.

Data to be encoded in the two-dimensional barcode represents address information of the corresponding file, which is formed of path information including a file server (document management server) name and file name. Or the address information is formed of a URL to the corresponding file, a file ID managed in the database 105 that stores the corresponding file or in a storage device of the MFP 100 itself, or the like.

In order to identify different types of characters to be encoded, an input data sequence is analyzed. Also, error detection and error correction levels are selected, and a minimum model number that can store input data is selected (step S900).

The input data sequence is converted into a predetermined bit sequence, and an indicator indicating a mode (numeric, alphanumeric, kanji, etc.) and an end pattern are appended as needed. Furthermore, the bit sequence is converted into predetermined bit code words (step S901).

At this time, for the purpose of error correction, the code word sequence is segmented into a predetermined number of blocks in accordance with the model number and error correction level, and error correction code words are generated for respective blocks and are appended after the data code word sequence (step S902).

The data code words of respective blocks obtained in step S902 are connected, and error correction code words and remainder code words as needed are connected after the data code word sequence (step S903).

Next, the code word module is set in a matrix together with a position detection pattern, separation pattern, timing pattern, alignment pattern, and the like (step S904).

Furthermore, a mask pattern optimal to the symbol encoding region is selected, and is converted by calculating XORs with the module obtained in step S904 (step S905).

Finally, type information and model number information are generated for the module obtained in step S905, thus completing a two-dimensional code symbol (step S906).

The aforementioned two-dimensional barcode that incorporates address information is appended to a predetermined position on raster data upon converting, e.g., a digital file to be printed into raster data, and then undergoes image formation. The user who received a paper sheet that has undergone image formation in this way scans that paper sheet by the image scanning unit 110, thus detecting the storage location of an original digital file from the pointer information in step S43.

As means for giving additional information for the same purpose, a method of directly appending pointer information to a document as a character string, and so-called watermarking methods including a method of embedding information by modulating the spacings of a character string in a document (especially, the spacings between neighboring characters), a method of embedding information in a halftone image in a document, and the like, can be applied.

[Another Embodiment Associated with File Access Right]

Normally, when a network is formed, and a file server represented by a document management server is set, re-use by a third party is often limited.

The above embodiment has been explained under the condition that all files stored in the document management server can be freely accessed, and the entire file or some objects of the file are re-usable. Hence, another embodiment associated with a case wherein when a file is searched for using pointer information in the above embodiment, the access right of a file that can be specified as a result of the search is limited will be described below using FIG. 12. FIG. 12 replaces FIG. 11.

Figure 11:
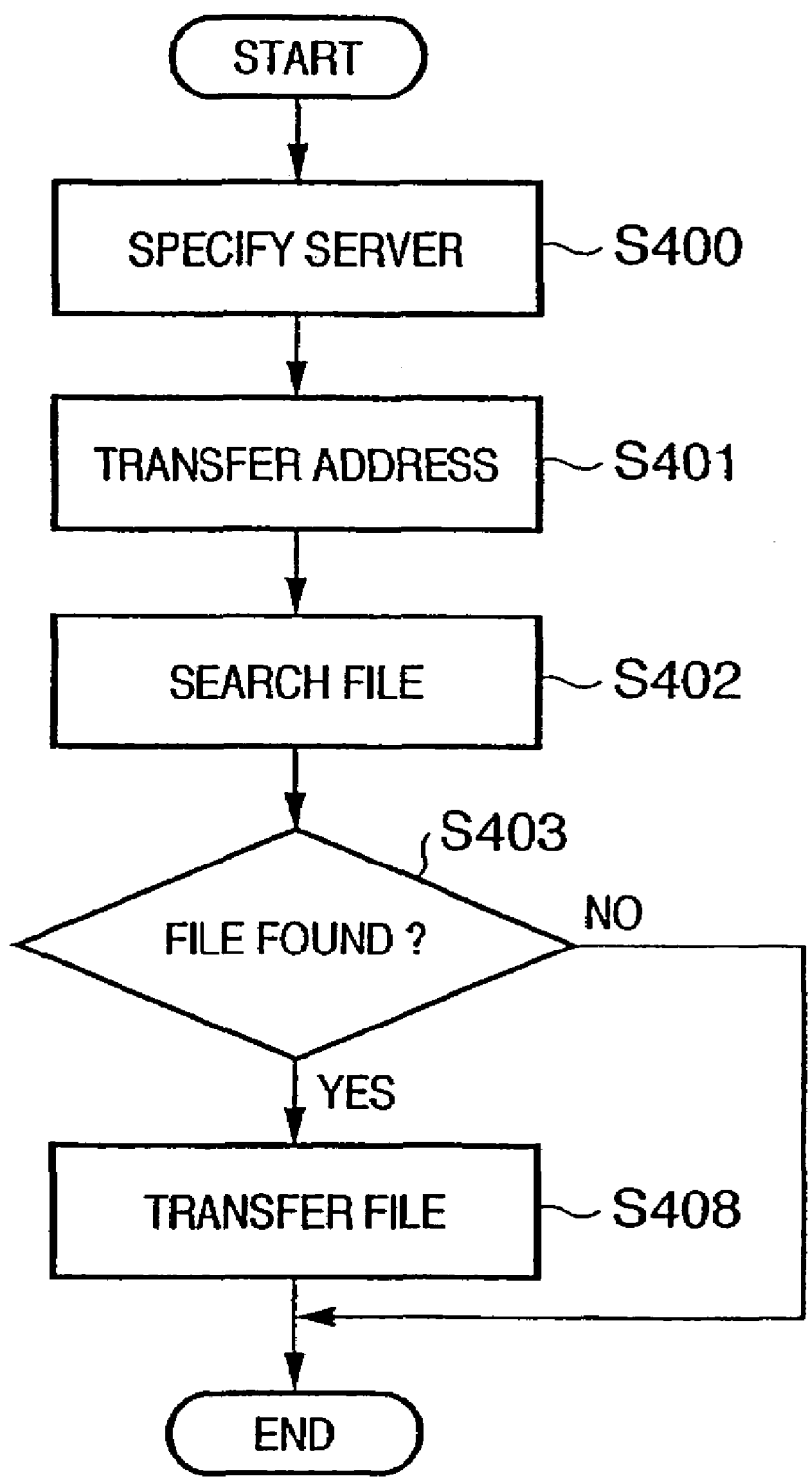
FIG. 11 is a flow chart showing a file search processing sequence in the embodiment of the present invention.
Figure 12:
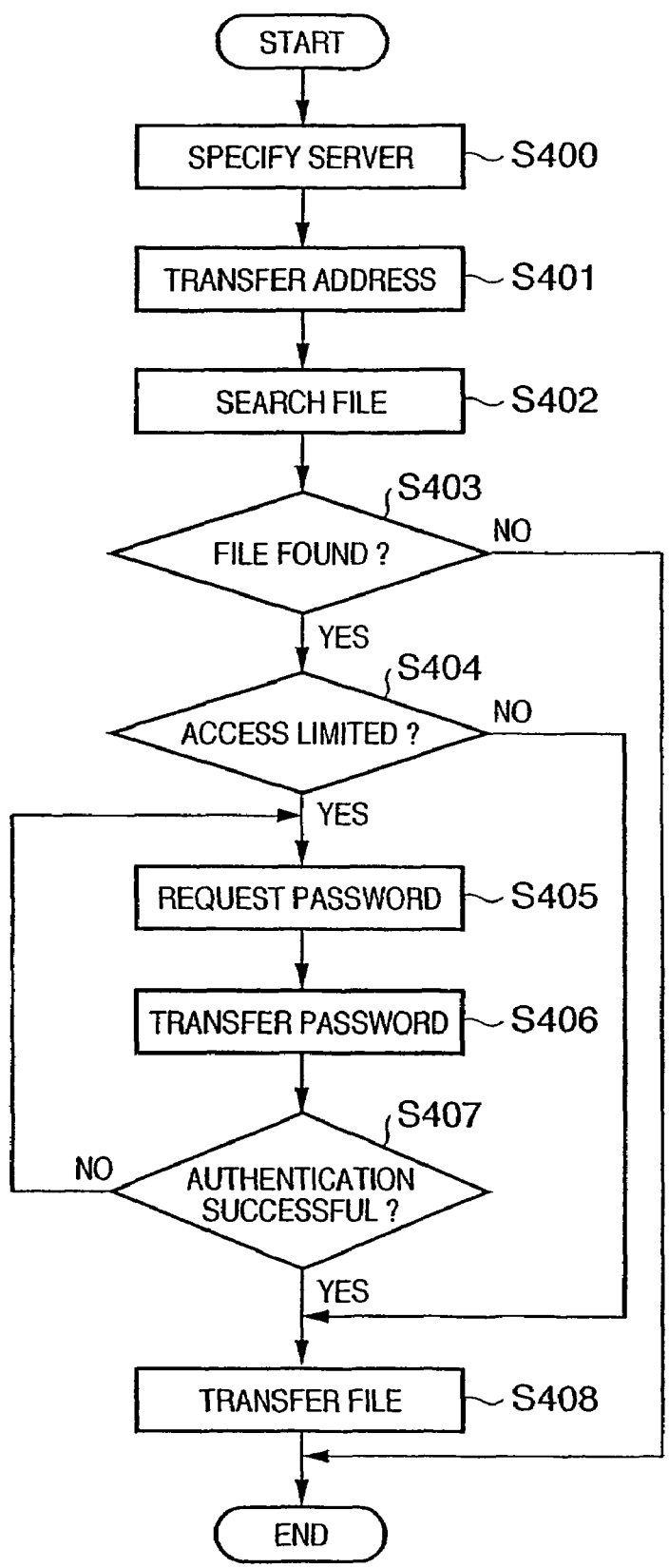
FIG. 12 is a flow chart showing another file search processing sequence in the embodiment of the present invention.

Since steps S400 to S403 are the same as those in the embodiment in FIG. 11, a description thereof will be omitted.

When a file is specified, the document management server checks access right information of that file. If the access right of that file is limited (step S404), the document management server requests the management PC 101 to transmit a password (step S405). The management PC 101 prompts the operator to input a password, and transmits the input password to the file server (step S406). In this embodiment, since the touch panel is used to input, a virtual keyboard is displayed on the display device 35, and a password is input by touching virtual keys.

The document management server collates the received password to make authentication (step S407). If authentication has succeeded, the server notifies the file address, and transfers a file to the management PC 101 if the process that the user wants is acquisition of image file data (step S408). Note that the authentication method for access right control is not limited to the method using the password in steps S405 and S406. For example, all other authentication means such as popular biological authentication (e.g., fingerprint authentication), authentication using a card, and the like can be adopted.

In the above embodiment, a file is specified by pointer information additionally given to a paper document. The same control can be applied to a case wherein a file is specified by the search process in steps S51 and S52 in FIG. 5.

Also, the vectorization process explained in steps S54 to S56 in FIG. 5 can be limited. That is, when a limitation of the access right to a given paper document is detected based on a watermark or the like from image information obtained by scanning that paper document, the vectorization process is executed only when authentication is successful, thus limiting use of documents with high secrecy.

[Another Embodiment Associated with File Specification]

In the above embodiment, means for specifying original file data from image information obtained by scanning a document specifies a document based on pointer information appended to the document or searches for a corresponding digital file on the basis of each object information described in the document, as has been described with reference to FIG. 5. In order to specify an original file more accurately, both of these means may be used together. That is, even when the presence of an original file can be detected based on pointer information obtained from a document, a layout search according to layout information or a full-text search based on a keyword obtained by character recognition is also conducted for the detected file using object information in the document, and a file that can yield a high matching rate is formally specified as an original file. For example, even when the lower-bit part of pointer information is doubtful and cannot be corrected by error correction, a file can be specified by narrowing down the search range. Therefore, a file can be quickly and accurately specified.

[Another Embodiment of Vectorization of Text Region]

Another embodiment of vectorization of a text region will be explained below.

At the beginning of a process of one document, a dictionary that stores no vector data is prepared. Upon vectorizing a given text block, one character is extracted from the text block, and a feature is extracted from the character image. Matching between the extracted feature and dictionary is made, and if they do not match, the feature extraction result of the character is registered in the dictionary, and intermediate data that refers to a character number of the registered character is generated. If the extracted feature of the character matches the dictionary, intermediate data that refers to a character number of the character in the dictionary is generated. The intermediate data is made up of the position and size of a character of interest in an image, and the character number in the dictionary which matches that character, and has a configuration, as shown in, e.g., FIG. 31. "x" represents the upper left x-coordinate value of a character rectangle, "y" represents the upper left y-coordinate value of the character rectangle, "w" represents the pixel value of the width of the character rectangle, "h" represents the pixel value of the height of the character rectangle, and "n" indicates that the character of interest matches the n-th character in the dictionary. Upon completion of the process for one text block, vector data are generated on the basis of the images of characters registered in the dictionary, and the intermediate data and the generated character vector data are composited to obtain the vectorization result of the text block.

Figure 30:
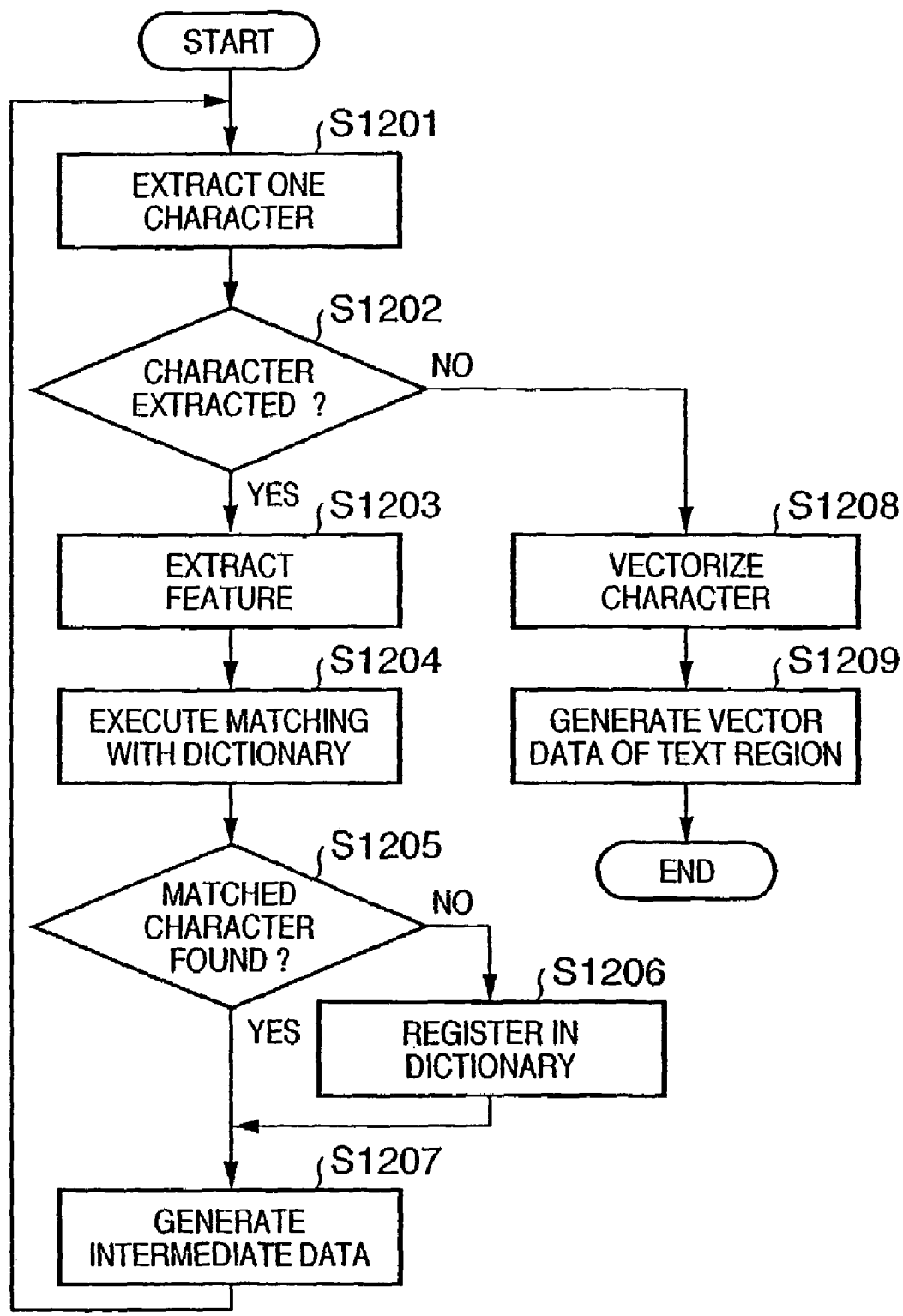
FIG. 30 is a flow chart showing the processing sequence for one text block.

FIG. 30 is a flow chart showing the processing sequence of one text block.

Let Nv be the number of characters registered in the dictionary at the beginning of the process, and N be the number of characters registered in the dictionary during the process. Then, Nv=N at the beginning of the process.

In a one-character extraction process in step S1201, one character region is extracted from image data of an input text block. It is checked in step S1202 if a character can be extracted as a result of step S1201. If YES in step S1202, the flow advances to step S1203; otherwise, the flow advances to step S1208.

In step S1203, a feature of the character is extracted. The feature of the character includes an aspect ratio, barycentric position, histogram vector of outline data, and the like (other features may be used).

In step S1204, matching between the feature of the character extracted in step S1203 and characters registered in the dictionary is made. Initially, the aspect ratio and barycentric position are compared with those the first character in the dictionary. If they are largely different, since that character is apparently a different one, the next character to be compared in the dictionary is selected without comparison using other kinds of information. If the two aspect ratios are nearly equal to each other, the histogram vectors of outline data are compared. In this case, the distance between vectors is normally calculated, and matching is successful with decreasing distance. A character which has a distance equal to or smaller than a predetermined value is picked up as a candidate character. In this way, matching with all characters in the dictionary is made.

It is checked in step S1205 if a matched character is found as a result of step S1204. If YES in step S1205, the flow advances to step S1207; otherwise, the flow advances to step S1206.

In step S1206, the feature data of the character whose process is in progress is registered in the dictionary. The dictionary has a format shown in FIG. 32, and the feature data is added to the end of the dictionary. In this case, the number of characters in the dictionary is incremented by 1 (N=N+1). An intermediate data ID stores the character number in FIG. 31.

In step S1207, intermediate data which has the format shown in FIG. 31 and is assigned with the corresponding character number in the dictionary is generated.

A process in step S1208 is executed upon completion of matching processes between all characters in the text block and the dictionary. Since Nv characters are registered in the dictionary at the beginning of the process, and N characters are registered in the dictionary at the end of the process, the vectorization process of (N−Nv) characters is executed. In this case, vector data are generated using at least one character image of a character stored in the dictionary.

In step S1209, intermediate data and vector data of respective characters registered in the dictionary are composited, and the composition result is output as the vectorization result of the text block.

With this process, since identical vector data can be used for identical characters for respective text blocks, respective characters in a document image can be coordinated, thus improving the appearance. Since vector data are generated using character images in a document, vector data which are faithful to the scanned document can also be generated.

[Another Embodiment of Vectorization]

In the above embodiment, when search means cannot specify an original file, the entire document image undergoes a vectorization process. For example, in case of a general document, not all objects in the document are newly created ones, and some objects may be diverted from other files. For example, a document creation application prepares some patterns of background objects (wallpapers), and the user normally selects and uses one of these patterns. Hence, such object is more likely to be present in other document files in the document file database as re-usable vector data.

Therefore, as another embodiment of the vectorization process (step S54) in FIG. 5, the database is searched for a file which includes an object which substantially matches each of individual objects segmented by the block selection process, and vector data of the matched object is individually acquired from that file. As a result, since the entire document need not be vectorized, faster vectorization can be assured, and deterioration of image quality due to vectorization can be prevented.

On the other hand, in FIG. 5, when an original file can be specified as a PDF in the search process (S51 to S53), that PDF often has, as an additional file, character codes obtained by already applying character recognition to text objects in that document. Upon vectorizing such PDF file, if the character code file is used, a character recognition process in the vectorization process in step S54 and subsequent steps can be skipped. That is, the vectorization process can be done more quickly.

[Another Embodiment of Vectorization]

Figure 28:
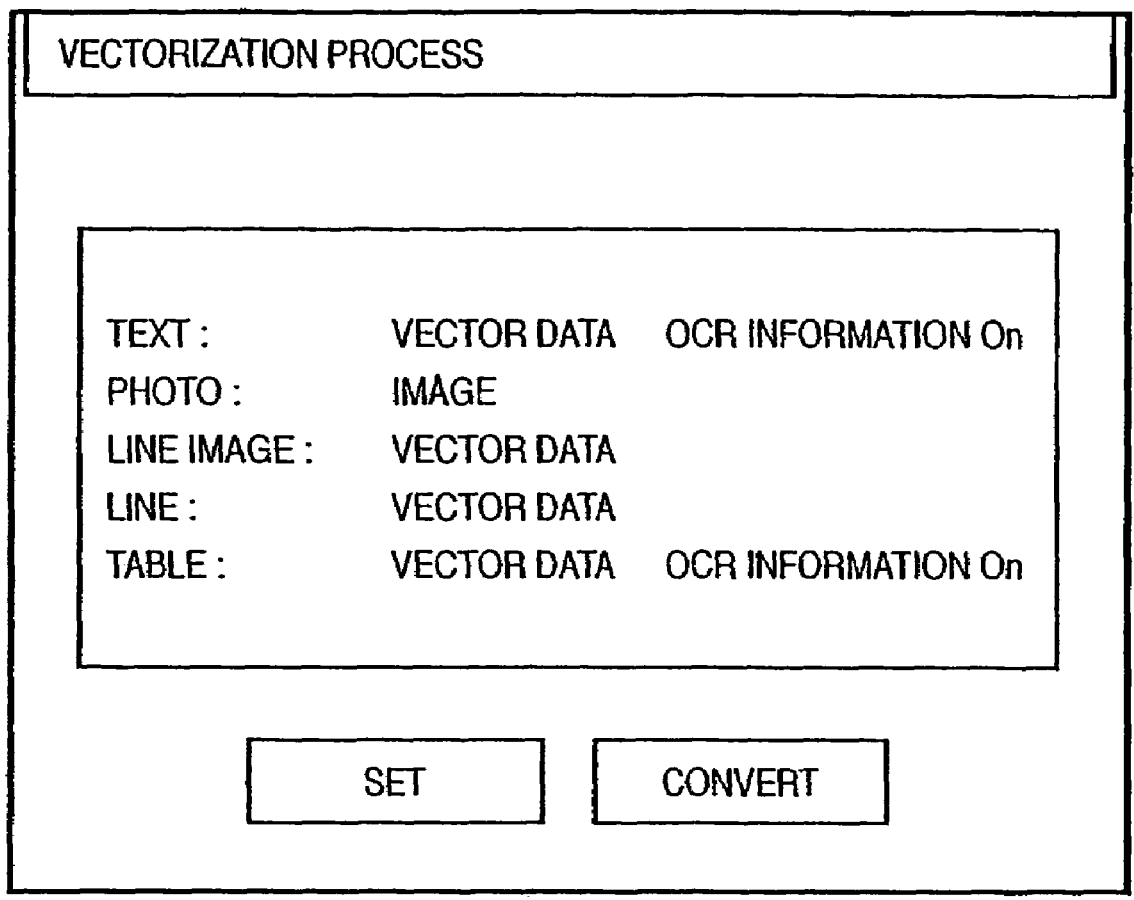
FIG. 28 shows a setup content confirmation window of the vectorization process in the embodiment of the present invention.

When the vectorization process is to be executed, an interface used to confirm the current setup contents, as shown in FIG. 28, may be displayed on the display device 35. The setup contents are set using the interfaces shown in FIGS. 23 to 27, and are saved in a storage device such as a hard disk. When the user touches a "convert" button in FIG. 28, the vectorization process is launched. When the user touches a "change" button, the setup windows shown in FIGS. 23 to 27 are displayed, and the current setups can be changed. However, such setup change is effective in only the current vectorization process, and setup information is not written in the hard disk. In this way, the vectorization process contents can be changed depending on the user's purpose or a document to be processed.

Figure 29:
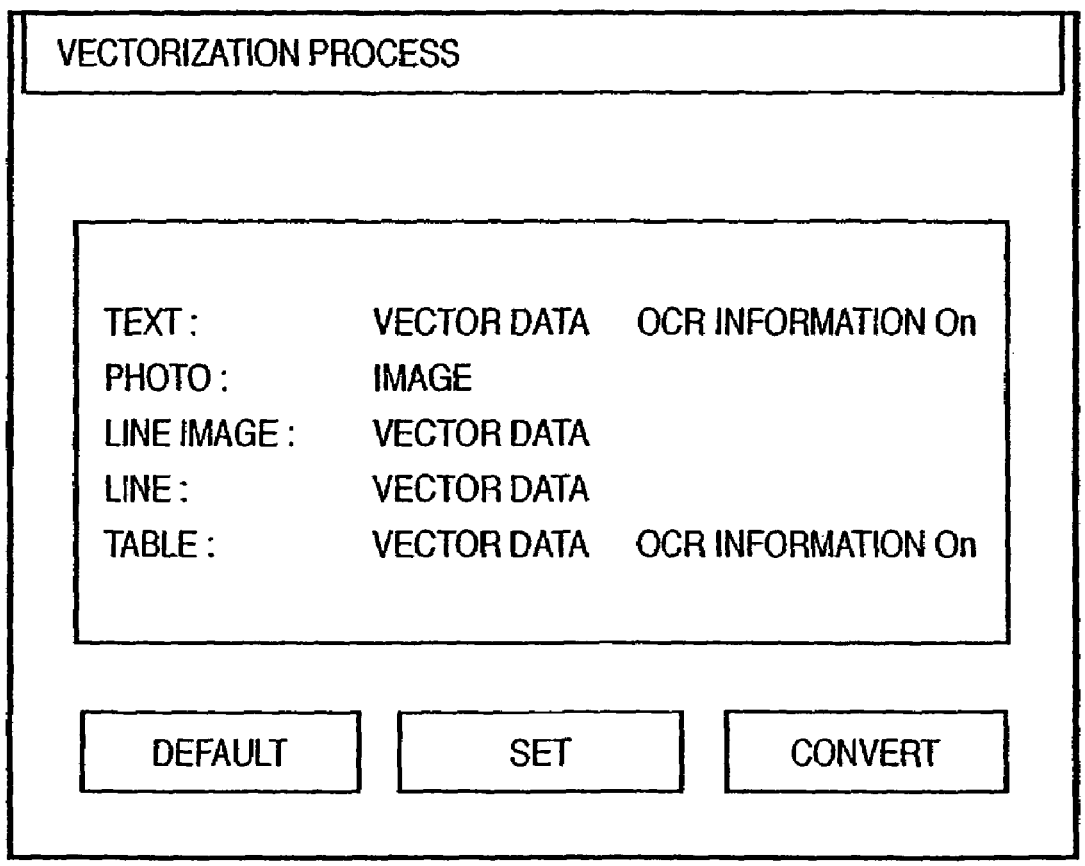
FIG. 29 shows another setup content confirmation window of the vectorization process in the embodiment of the present invention.

Also, by preparing a "default" button, as shown in FIG. 29, the changed setup contents can be written in the storage device such as a hard disk or the like, thus changing setups which are to be displayed as default setups in the next vectorization process. In this way, the vectorization process according to the user's purpose can be made.

As described above, according to this embodiment, when a paper document is copied by a copying machine, the location of an original digital file corresponding to that document can be confirmed, and a print process is done based on the original digital file, thus obtaining a copy free from any deterioration of image quality.

Even when a paper document whose original digital file is not available is to be scanned, a vectorization process is executed to register its digital file in an early stage, thus suppressing further deterioration of image quality.

Furthermore, in a registration process executed upon scanning a paper document whose original digital file is not available, a file is registered in a format that allows an application program to re-edit that file. Hence, a document correction process and the like can be facilitated.

Since a paper document is converted into vector data, the required storage capacity can be reduced compared to a case wherein a document image is stored as an image file.

Since a paper document is converted into vector data, deterioration of image quality can be suppressed even when an image process such as enlargement or the like is applied.

Since a document image can be segmented into regions for respective properties, and the execution method of the vectorization process can be set for each property, data that matches the user's purpose can be generated.

As can be easily understood from the description of the embodiment, most of processes as characteristic features of this embodiment are implemented by a computer program executed by the management PC 101 as a versatile information processing apparatus. Hence, the present invention includes such computer program within its scope. Normally, since a program which runs on a computer is ready to be executed after a computer readable storage medium such as a CD-ROM or the like is set and that program is copied or installed in a system, the present invention also includes such computer readable storage medium as its scope.

As described above, the present invention can provide the following environment. That is, an original document file corresponding to a document to be copied is specified from image data of that document to be copied, and a print process is made based on the specified file so as to prevent deterioration of image quality. Also, when a document to be copied is not registered, a registration process is executed to suppress deterioration of image quality in an early stage.

As many apparently widely different embodiments of the present invention can be made without departing from the spirit and scope thereof, it is to be understood that the invention is not limited to the specific embodiments thereof except as defined in the claims.

The invention claimed is:

1. A control method of controlling an image processing apparatus, the method comprising:
   controlling the information processing apparatus to perform a setting step of setting a vectorization processing method to each of a plurality of attributes via a graphical user-interface displayed in a display;
   controlling the information processing apparatus to perform a search step of searching for original digital data stored in storage means on the basis of an input document image;
   controlling the information processing apparatus to perform a vectorization step of, in a case where original digital data corresponding to the input document image is not specified in said search step, segmenting the input document image into a plurality of regions on the basis of attributes of objects included in the input document image, and executing vectorization processes for each of the plurality of regions, in accordance with the vectorization methods for each of the plurality of attributes set in said setting step; and
   controlling the information processing apparatus to perform a storage step of storing, as new original digital data, vector data of the input document image converted in said vectorization step into the storage means which is searched in said search step.

2. The method according to claim 1, further comprising a notifying step of notifying, in a case where the original digital data is specified in said search step, a storage address of the original digital data corresponding to the input document image, and
   notifying, in a case where original digital data is not specified in said search step, a storage address of the vector data of the input document image converted in said vectorization step.

3. The method according to claim 1, wherein said search step includes steps of:
   recognizing an identifier which is appended to the input document image and indicates a storage address of the original digital data; and
   searching for the original digital data on the basis of the recognition result of the identifier.

4. The method according to claim 3, wherein at least one of a two-dimensional barcode, a character string, and a watermark is used as the identifier that indicates the storage address of the original digital data.

5. The method according to claim 1, wherein said vectorization step includes steps of:
   extracting outlines of significant pixels from a region with a text attribute; and
   generating outline vectors on the basis of the extracted outlines.

6. The method according to claim 1, wherein said vectorization step includes a step of generating vector data of a region with a text attribute, on the basis of a character recognition result of that region, and predetermined vector data corresponding to each character.

7. The method according to claim 1, wherein said vectorization step includes a step of generating, in a case where a character recognition precision is high, vector data of a region with a text attribute, on the basis of a character recognition result of that region, and predetermined vector data for each character, and generating, in a case where the character recognition precision is low, outline vectors on the basis of outlines of pixels which form characters.

8. The method according to claim 1, wherein said vectorization step includes steps of:
   detecting identical character images from a region with a text attribute; and
   generating vector data of that region by applying vector data generated from one of the identical character images for respective detected identical character images.

9. The method according to claim 1, wherein said vectorization step includes steps of:
   extracting outlines of significant pixels from a region with a line or line image attribute; and
   generating outline vectors on the basis of the extracted outlines.

10. The method according to claim 1, wherein said vectorization step includes steps of:
    extracting outlines of significant pixels from a region with a table attribute; and
    generating outline vectors on the basis of the extracted outlines.

11. The method according to claim 1, wherein said vectorization step includes steps of:
    generating outline vectors on the basis of outlines of ruled lines for a ruled line part of a region with a table attribute; and
    executing a vectorization process similar to that for a region with a text attribute for a text part of a region with a table attribute.

12. The method according to claim 1, wherein said vectorization step includes a step of executing an image compression process for a region with a photo attribute.

13. The method according to claim 1, wherein said setting step includes a step of allowing a user to set whether each of the plurality of attributes is to be converted into vector data or is handled as image data.

14. The method according to claim 1, wherein said setting step includes a step of allowing a user to set whether or not to append a character recognition result to the vector data.

15. The method according to claim 1, wherein said setting step includes a step of allowing a user to set whether each of the plurality of attributes is to be converted into vector data, or is handled as image data, or is included in a background object.

16. The method according to claim 1, further comprising a print control step of appending, to digital data stored in the storage means, information indicating a storage address of the digital data, and printing out the appended digital data.

17. The method according to claim 1, wherein said search step includes a step of searching for the original digital data on the basis of a character recognition result of character images included in the input document image.

18. The method according to claim 1, wherein said search step includes a step of searching for the original digital data on the basis of a layout of respective objects in the input document image.

19. The method according to claim 1, wherein said search step includes steps of:
    displaying, in a case where a plurality of candidates of the original document data corresponding to the input document image are found, the candidates; and
    prompting a user to select one of the candidates in order to specify the original digital data corresponding to the input document image.

20. The method according to claim 1, wherein said vectorization step includes a step of executing, in a case where the original digital data specified in the search step is image data, and a user instruction for executing a vectorization process is received, the vectorization process for the image.

21. The method according to claim 1, wherein said vectorization step further includes steps of:
    displaying, when performing a vectorization process, the information set in said setting step so as to change the setting; and
    changing the setting of the vectorization method set for each of the plurality of attributes if a user changed the setting.

22. A computer-executable computer program stored in a computer-readable storage medium, said computer-executable program being executable by an information processing apparatus so as to control the information processing apparatus to execute:
    a setting step of setting a vectorization processing method to each of a plurality of attributes via a graphical user-interface displayed in a display;
    a search step of searching for original digital data stored in storage means on the basis of an input document image;
    a vectorization step of, in a case where original digital data corresponding to the input document image is not specified in said search step, segmenting the input document image into a plurality of regions on the basis of attributes of objects included in the input document image, and executing vectorization processes for each of the plurality of regions, in accordance with the vectorization methods for each of the plurality of attributes set in said setting step; and
    a storage step of storing, as a new original digital data, vector data of the input document image converted in said vectorization step into the storage means which is searched in said search step.

23. A computer-readable storage medium storing a computer-executable program, said computer-executable program being executable by an information processing apparatus so as to control the information processing apparatus to execute:
    a setting step of setting a vectorization processing method to each of a plurality of attributes via a graphical user-interface displayed in a display;
    a search step of searching for original digital data stored in storage means on the basis of an input document image;
    a vectorization step of, in a case where original digital data corresponding to the input document image is not specified in said search step, segmenting the input document image into a plurality of regions on the basis of attributes of objects included in the input document image, and executing vectorization processes for each of the plurality of regions, in accordance with vectorization methods for each of the plurality of attributes set in said setting step; and
    a storage step of storing, as a new original digital data, vector data of the document image converted in said vectorization step into the storage means which is searched in said search step.

24. An image processing system which process a document image, said system comprising:
    setting means for setting a vectorization processing method to each of a plurality of attributes via a graphical user-interface displayed in a display;

search means for searching for original digital data stored in a storage means on the basis of an input document image;

vectorization means for, in a case where original digital data corresponding to the input document image is not specified by said search means, segmenting the input document image into a plurality of regions on the basis of attributes of objects included in the input document image, and executing vectorization processes for each of the plurality of regions, in accordance with the vectorization methods for each of the plurality of attributes set by said setting means; and storage control means for storing, as a new original digital data, vector data of the input document image converted by said vectorization means into the storage means which is searched by said search means.

25. An information processing apparatus which can control an operation of a scanner-equipped device which has at least a scanner, comprising;

setting means for setting a vectorization processing method to each of a plurality of attributes via a graphical user-interface displayed in a display;

search means for searching for original digital data stored in a storage means on the basis of an input document image scanned by the scanner-equipped device;

vectorization means for, in a case where original digital data corresponding to the input document image is not specified by said search means, segmenting the input document image into a plurality of regions on the basis of attributes of objects included in the input document image, and executing vectorization processes for each of the plurality of regions, in accordance with the vectorization methods for each of the plurality of attributes set by said setting means; and storage control means for storing, as a new original digital data, vector data of the input document image converted by said vectorization means into the storage means which is searched by said search means.

26. A control method of controlling an image processing apparatus, comprising:

a setting step of setting a vectorization processing method to each of a plurality of attributes based on a user instruction via a graphical user-interface displayed in a display;

a vectorization step of segmenting an input document image into a plurality of regions on the basis of attributes of objects included in the input document image, and executing vectorization processes for each of the plurality of regions, in accordance with the vectorization methods for each of attributes set in said setting step; and a storage step of storing vector data of the input document image converted in said vectorization step into a storage.

27. A computer-readable storage medium storing a computer-executable program, said computer-executable program being executable by an information processing apparatus so as to control the information processing apparatus to execute:

a setting step of setting a vectorization processing method to each of a plurality of attributes based on a user instruction via a graphical user-interface displayed in a display;

a vectorization step of segmenting an input document image into a plurality of regions on the basis of attributes of objects included in the input document image, and executing vectorization processes for each of the plurality of regions, in accordance with the vectorization methods for each of the plurality of attributes set in said setting step; and a storage step of storing vector data of the input document image converted in said vectorization step into a storage.

28. An information processing apparatus comprising:

setting means for setting a vectorization processing method to each of a plurality of attributes based on a user instruction via a graphical user-interface displayed in a display;

vectorization means for segmenting an input document image into a plurality of regions on the basis of attributes of objects included in the input document image, and executing vectorization processes for each of the plurality of regions, in accordance with the vectorization methods for each of the plurality of attributes set by said setting means; and storage control means for storing vector data of the input document image convened by said vectorization means into a storage.

* * * * *